(12) United States Patent
Kumar et al.

(10) Patent No.: US 9,946,603 B1
(45) Date of Patent: Apr. 17, 2018

(54) MOUNTABLE CONTAINER FOR INCREMENTAL FILE BACKUPS

(71) Applicant: EMC IP Holding Company LLC, Hopkinton, MA (US)

(72) Inventors: Kiran MV Kumar, Karnataka (IN); Vladimir Mandic, San Jose, CA (US); Manjunath Jagannatha, Bangalore (IN); Ravi Shankar Panem, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 300 days.

(21) Appl. No.: 14/686,668

(22) Filed: Apr. 14, 2015

(51) Int. Cl.
*G06F 11/14* (2006.01)
*G06F 17/30* (2006.01)

(52) U.S. Cl.
CPC .... *G06F 11/1451* (2013.01); *G06F 17/30106* (2013.01); *G06F 17/30117* (2013.01); *G06F 2201/84* (2013.01)

(58) Field of Classification Search
CPC .......... G06F 11/1451; G06F 17/30117; G06F 17/30106; G06F 2201/84
USPC ......................................................... 707/646
See application file for complete search history.

(56) References Cited

U.S. PATENT DOCUMENTS

| | | | |
|---|---|---|---|
| 5,210,866 A | 5/1993 | Milligan | |
| 5,758,347 A * | 5/1998 | Lo | G06F 17/30 |
| 5,778,395 A * | 7/1998 | Whiting | G06F 11/1464 |
| 5,873,097 A * | 2/1999 | Harris | G06F 17/30348 |
| 6,397,229 B1 * | 5/2002 | Menon | G06F 11/1451 |
| | | | 707/641 |
| 6,408,314 B1 | 6/2002 | Liu | |
| 6,560,615 B1 | 5/2003 | Zayas | |
| 6,615,225 B1 * | 9/2003 | Cannon | G06F 11/1453 |
| 6,618,794 B1 | 9/2003 | Sicola | |
| 6,985,901 B1 * | 1/2006 | Sachse | H04L 41/5032 |
| 7,093,086 B1 | 8/2006 | van Rietschote | |
| 7,266,655 B1 | 9/2007 | Escabi, II | |
| 7,321,962 B1 | 1/2008 | Fair | |
| 7,653,624 B1 * | 1/2010 | Reitmeyer | G06F 17/30067 |
| | | | 707/646 |
| 7,689,623 B1 | 3/2010 | Liu | |

(Continued)

FOREIGN PATENT DOCUMENTS

| | | | |
|---|---|---|---|
| CN | 1873622 A | * | 12/2006 |
| CN | 105376329 A | * | 3/2016 |
| EP | 2474909 A2 | | 7/2012 |

OTHER PUBLICATIONS

Hewlett-Packard Development Company, Disk-Assisted Backup White Paper, Sep. 2006, 30 pages.

*Primary Examiner* — Phuong Thao Cao
(74) *Attorney, Agent, or Firm* — Staniford Tomita LLP

(57) ABSTRACT

Information identifying a set of changed blocks on a volume of a client are received. The changed blocks are blocks of the volume that have changed since a previous backup of the client. The set of changed blocks are filtered to identify a subset of changed blocks that are associated with a particular file. The subset of changed blocks is streamed to a backup storage server for storage as an incremental virtual hard disk file. The incremental virtual hard disk file is associated to a full backup virtual hard disk file, where the full backup virtual hard disk file is a full backup of a previous version of the particular file.

18 Claims, 19 Drawing Sheets

(56) References Cited

U.S. PATENT DOCUMENTS

| | | | |
|---|---|---|---|
| 7,725,438 B1 | 5/2010 | Shah | |
| 7,743,028 B1* | 6/2010 | Stringham | G06F 11/1451 707/646 |
| 7,797,279 B1 | 9/2010 | Starling | |
| 8,055,613 B1* | 11/2011 | Mu | G06F 11/1451 707/610 |
| 8,060,475 B1 | 11/2011 | Tsaur | |
| 8,060,476 B1 | 11/2011 | Afonso | |
| 8,099,391 B1 | 1/2012 | Monckton | |
| 8,099,572 B1 | 1/2012 | Arora | |
| 8,117,168 B1* | 2/2012 | Stringham | G06F 11/1451 707/646 |
| 8,135,676 B1* | 3/2012 | Poojary | G06F 11/1451 707/646 |
| 8,200,637 B1 | 6/2012 | Stringham | |
| 8,225,109 B1* | 7/2012 | Kalligudd | G06F 21/6209 380/255 |
| 8,234,469 B2* | 7/2012 | Ranade | G06F 11/1451 707/602 |
| 8,239,348 B1 | 8/2012 | Bezbaruah | |
| 8,244,681 B2 | 8/2012 | Laffin | |
| 8,341,122 B2* | 12/2012 | Sawdon | G06F 11/1451 707/641 |
| 8,370,304 B2* | 2/2013 | Sawdon | G06F 11/1451 707/641 |
| 8,386,733 B1 | 2/2013 | Tsaur | |
| 8,442,945 B1 | 5/2013 | Doerner | |
| 8,495,022 B1 | 7/2013 | Zhu | |
| 8,539,008 B2 | 9/2013 | Faith | |
| 8,539,179 B1 | 9/2013 | Stringham | |
| 8,600,937 B1 | 12/2013 | Ravan | |
| 8,650,162 B1* | 2/2014 | Vaikar | G06F 11/1451 707/692 |
| 8,676,809 B1* | 3/2014 | Naftel | G06F 11/1448 707/746 |
| 8,719,286 B1 | 5/2014 | Xing | |
| 8,738,871 B1 | 5/2014 | Naftel | |
| 8,738,883 B2* | 5/2014 | Wade | G06F 11/1471 711/162 |
| 8,782,005 B2 | 7/2014 | Barnes | |
| 8,793,217 B2* | 7/2014 | Karonde | G06F 11/1448 707/646 |
| 8,849,878 B1 | 9/2014 | Bachu | |
| 8,904,125 B1 | 12/2014 | Elling | |
| 8,918,606 B1 | 12/2014 | Stringham | |
| 8,949,829 B1 | 2/2015 | Xing | |
| 8,983,952 B1 | 3/2015 | Zhang | |
| 8,990,164 B1 | 3/2015 | Mahajan | |
| 8,990,815 B1 | 3/2015 | Kalekar | |
| 8,996,468 B1 | 3/2015 | Mattox | |
| 9,075,532 B1 | 7/2015 | Bromley | |
| 9,152,508 B1 | 10/2015 | Barnes | |
| 9,195,672 B1 | 11/2015 | Pang | |
| 9,251,020 B1 | 2/2016 | Kalekar | |
| 9,292,520 B1 | 3/2016 | Madiraju Varadaraju | |
| 9,298,561 B1 | 3/2016 | Sawhney | |
| 9,348,703 B1 | 5/2016 | Mam | |
| 9,383,924 B1* | 7/2016 | Fullbright | G06F 3/0608 |
| 9,391,865 B1 | 7/2016 | Thiam | |
| 9,405,482 B2 | 8/2016 | Varadharajan | |
| 9,424,136 B1 | 8/2016 | Teater | |
| 9,430,332 B1 | 8/2016 | Bahadure | |
| 9,507,673 B1 | 11/2016 | Rangapuram | |
| 9,535,907 B1* | 1/2017 | Stringham | G06F 11/1435 |
| 9,606,875 B2 | 3/2017 | Bushman | |
| 9,633,027 B1* | 4/2017 | Madiraju Varadaraju | G06F 17/30091 |
| 9,633,032 B2 | 4/2017 | Stoakes | |
| 9,823,977 B2* | 11/2017 | Dornemann | G06F 11/1451 |
| 2002/0194205 A1 | 12/2002 | Brown | |
| 2003/0126215 A1* | 7/2003 | Udell | G06F 21/10 709/206 |
| 2004/0078641 A1 | 4/2004 | Fleischmann | |
| 2005/0060356 A1* | 3/2005 | Saika | G06F 11/1451 |
| 2005/0193235 A1 | 9/2005 | Sandorfi | |
| 2005/0216788 A1 | 9/2005 | Mani-Meitav | |
| 2005/0257062 A1 | 11/2005 | Ignatius | |
| 2006/0064444 A1 | 3/2006 | van Ingen | |
| 2007/0112895 A1* | 5/2007 | Ahrens | G06F 11/1435 |
| 2007/0179998 A1 | 8/2007 | Swanepoel | |
| 2007/0220071 A1 | 9/2007 | Anzai | |
| 2008/0037777 A1 | 2/2008 | Ignatius | |
| 2008/0162599 A1* | 7/2008 | Mittal | G06F 11/1451 |
| 2009/0307286 A1* | 12/2009 | Laffin | G06F 11/1451 |
| 2010/0049929 A1 | 2/2010 | Nagarkar | |
| 2010/0076932 A1 | 3/2010 | Lad | |
| 2010/0077165 A1* | 3/2010 | Lu | G06F 11/1451 711/162 |
| 2010/0205370 A1 | 8/2010 | Ikawa | |
| 2010/0215343 A1 | 8/2010 | Ikeda | |
| 2010/0318757 A1* | 12/2010 | Beeken | G06F 11/1456 711/162 |
| 2011/0047340 A1 | 2/2011 | Olson | |
| 2011/0125714 A1 | 5/2011 | Manson | |
| 2011/0153567 A1* | 6/2011 | Sawdon | G06F 11/1451 707/645 |
| 2011/0218966 A1* | 9/2011 | Barnes | G06F 17/30079 707/645 |
| 2011/0231367 A1* | 9/2011 | Niles | G06F 11/1453 707/646 |
| 2011/0246731 A1 | 10/2011 | Ninose | |
| 2011/0252208 A1 | 10/2011 | Ali | |
| 2012/0005163 A1* | 1/2012 | Ahrens | G06F 11/1435 707/646 |
| 2012/0016841 A1 | 1/2012 | Karonde | |
| 2012/0066193 A1 | 3/2012 | King | |
| 2012/0078855 A1 | 3/2012 | Beatty | |
| 2012/0084258 A1 | 4/2012 | Karonde | |
| 2012/0084524 A1 | 4/2012 | Gokhale | |
| 2012/0117113 A1* | 5/2012 | Fujisawa | G06F 17/30144 707/771 |
| 2012/0117342 A1 | 5/2012 | Karonde | |
| 2012/0179655 A1 | 7/2012 | Beatty | |
| 2012/0209812 A1* | 8/2012 | Bezbaruah | G06F 9/45558 707/646 |
| 2012/0290540 A1* | 11/2012 | Walkauskas | G06F 17/30303 707/674 |
| 2013/0080397 A1 | 3/2013 | Payne | |
| 2013/0138613 A1 | 5/2013 | Paulzagade | |
| 2013/0151477 A1 | 6/2013 | Tsaur | |
| 2013/0290275 A1 | 10/2013 | Stoakes | |
| 2013/0339298 A1 | 12/2013 | Muller | |
| 2014/0164330 A1 | 6/2014 | Barnes | |
| 2014/0181033 A1* | 6/2014 | Pawar | G06F 11/1474 707/644 |
| 2014/0181034 A1 | 6/2014 | Harrison | |
| 2014/0181048 A1 | 6/2014 | Varadharajan | |
| 2014/0181438 A1 | 6/2014 | Varadharajan | |
| 2014/0195791 A1 | 7/2014 | Teli | |
| 2014/0201151 A1 | 7/2014 | Kumarasamy | |
| 2014/0214769 A1 | 7/2014 | Takayama | |
| 2015/0052366 A1 | 2/2015 | Bachu | |
| 2015/0112939 A1 | 4/2015 | Cantwell | |
| 2015/0112941 A1 | 4/2015 | Cai | |
| 2015/0127804 A1 | 5/2015 | Kripalani | |
| 2015/0142745 A1* | 5/2015 | Tekade | G06F 11/1451 707/646 |
| 2015/0242283 A1* | 8/2015 | Simoncelli | G06F 11/1456 711/162 |
| 2015/0293817 A1* | 10/2015 | Subramanian | G06F 17/30212 707/645 |
| 2015/0378843 A1 | 12/2015 | Nanivadekar | |
| 2016/0070623 A1* | 3/2016 | Derk | G06F 11/1469 714/6.23 |
| 2016/0147607 A1* | 5/2016 | Dornemann | G06F 11/1435 711/162 |
| 2016/0232060 A1 | 8/2016 | Nanivadekar | |
| 2016/0306558 A1 | 10/2016 | Varadharajan | |

(56) References Cited

U.S. PATENT DOCUMENTS

2017/0109241 A1\* 4/2017 Dornemann ........ G06F 11/1451
2017/0235642 A1 8/2017 Madiraju Varadaraju
2017/0255526 A1 9/2017 Barnes
2017/0344442 A1\* 11/2017 Pawar ............... G06F 17/30289

\* cited by examiner

| MBR 305 | GPT Header 310 | GPT Primary Entries 315 | Disk & Volume Contents 320 | GPT Entries 325 | GPT Header 330 |

FIG. 3

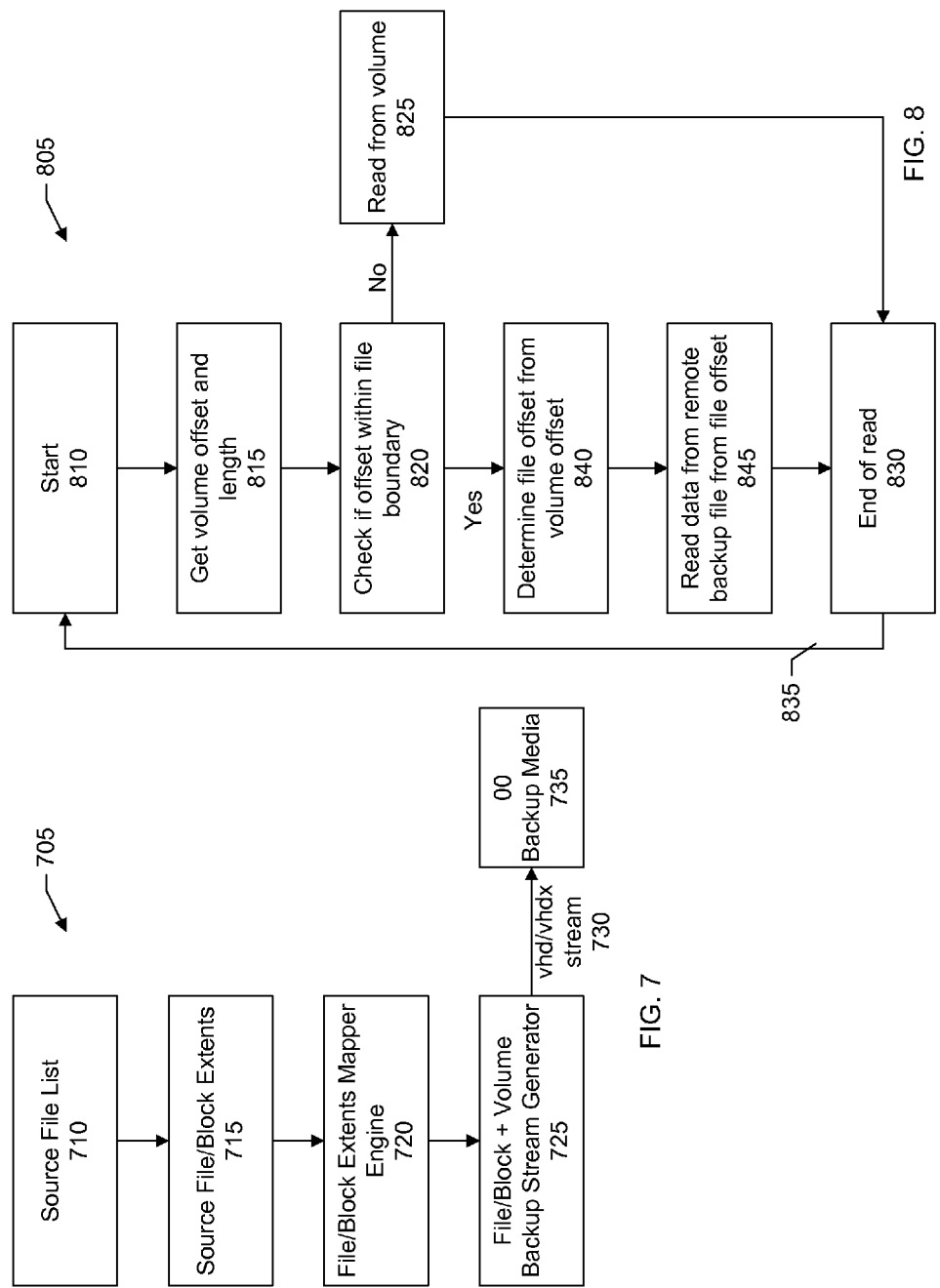

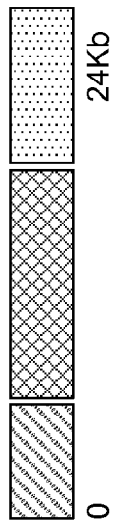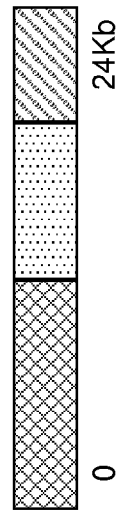
FIG. 10
FIG. 12
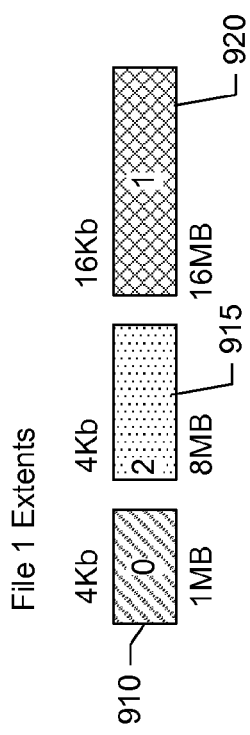
FIG. 9
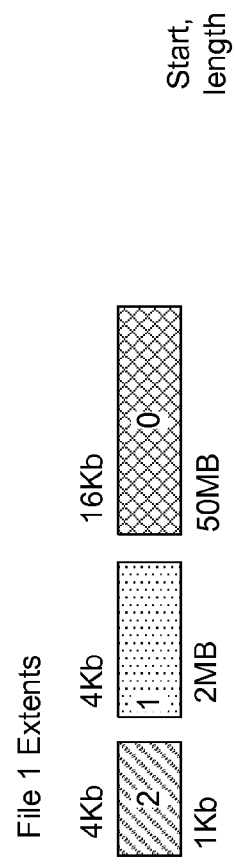
FIG. 11

| PB 0 | PB 1 | PB 2 | PB 3 | SB 0 | PB 4 | PB 5 | PB 6 | PB 7 | SB 1 | |

PB Entry for Payload Block
SB Entry for Sector Bitmap Block

FIG. 15B

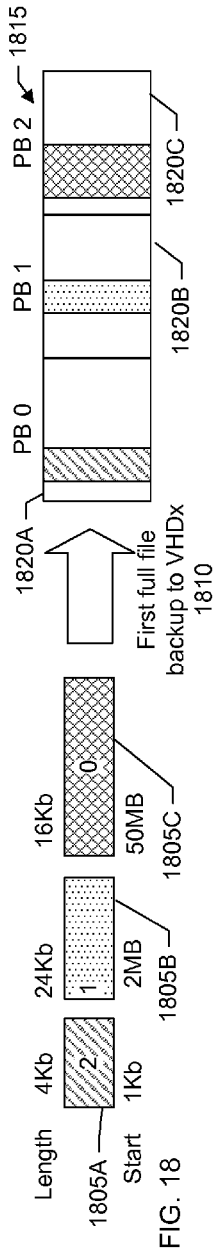
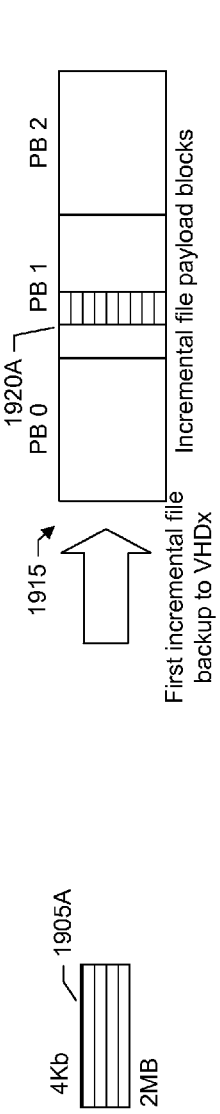
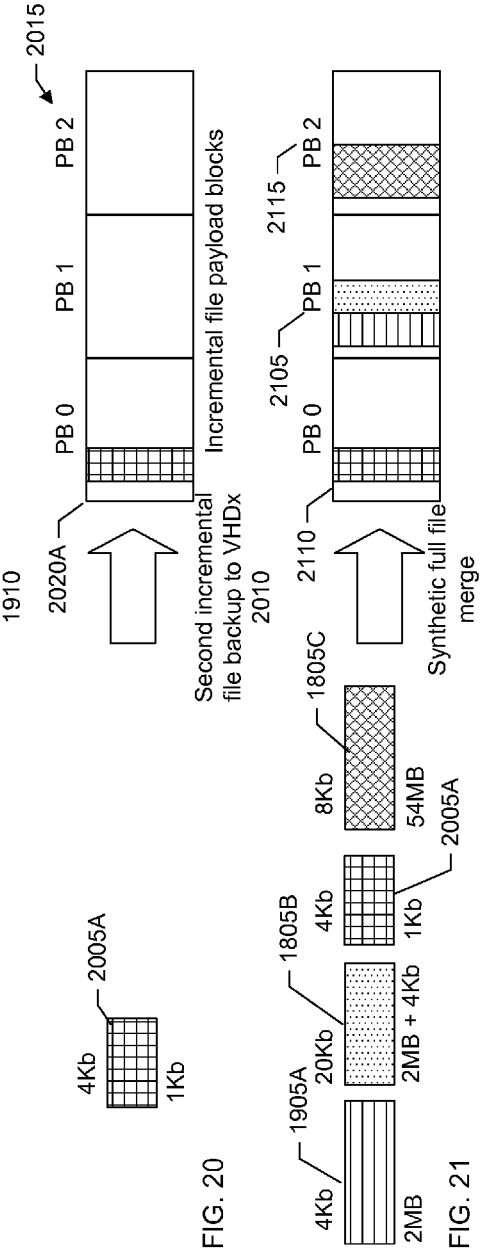
FIG. 18
FIG. 19
FIG. 20
FIG. 21

Payload block size: 2MB
All payload blocks are fully
occupied, e.g., (0,2048K) for
level full backup

PB0 = (0,1K), (4K, 8K)
PB2 = (16K, 32K)
PB6 = (256K, 16K)

PB0 = (4K,2K)
PB1 = (20K, 4K)
PB5 = (128K, 4K)

Merged extents within common payload block
are in the following format (start, length, id)
where id refers to which level of the backup.
The payload blocks which need to be merged
are shown with a pattern of slanted lines.

PB0 = (0, 1K, 1), (4K, 2K, 2), (6K, 2K, 1), (8K, 2042K, 0)
PB1 = (0, 20K, 0), (20K, 4K, 2), (24K, 2024K, 0)
PB2 = (0, 16K, 0), (16K, 32K, 1), (48K, 2000K, 0)
PB3 = (0, 2048K, 0)
PB4 = (0, 2048K, 0)
PB5 = (0, 128K, 0), (128K, 4K, 2), (132K, 1916K, 0)
PB6 = (0, 256K, 0), (256K, 16K, 1), (272K, 1776K, 0)
PB7 = Empty

FIG. 26

PB Entry for Payload Block
SB Entry for Sector Bitmap Block

Full
Level 1
Level 2
Merged

MOUNTABLE CONTAINER FOR INCREMENTAL FILE BACKUPS

CROSS-REFERENCE TO RELATED APPLICATIONS

This patent application is related to U.S. patent application Ser. Nos. 14/686,400; 14/686,438; and Ser. No. 14/686,468, all filed Apr. 14, 2015, which are all incorporated by reference along with all other references cited herein.

TECHNICAL FIELD

The present invention relates generally to the field of backing up computer data, and, more particularly, using mountable containers for performing full and incremental backups of files.

BACKGROUND

In today's digital society organizations depend on having ready access to their data. Data, however, can be lost in a variety of ways such as through disasters and catastrophes (e.g., fires or flooding), media failures (e.g., disk crash), computer viruses, accidental deletion, and so forth. Thus, it is important that the data be backed up. An organization may have an immense amount of data that is critical to the organization's operation. Backing up data and subsequently recovering backed up data, however, can involve large amounts of computing resources such as network bandwidth, processing cycles, and storage due to the complexity of data to be backed up and the amount of data that is backed up.

In some cases, it is desirable to selectively backup one or more individual files of a volume in a mountable format in order to, for example, speed recoveries, enable the replay of logs, and ensure data consistency. Excluding other files in the volume from the backup helps to conserve computing resources because a backup of a single file (or subset of files) in the volume is faster than backing up the entire volume. Computing resources such as network bandwidth and storage on the backup media will also be conserved. It is also desirable to perform incremental backups of a particular file so that changes to the file are also backed up. Further, having a full backup of a file in a mountable format (e.g., can be assigned a drive letter and accessed through the computer's file system) helps to ensure a smooth recovery and reduce administrative overhead.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 3 shows an example of a block-based backup image format.

FIG. 7 shows another flow for backing up one or more files.

FIG. 8 shows a flow for processing a backup of a file into a VHD/VHDx stream.

FIG. 9 shows a block diagram of file blocks in a target volume.

FIG. 10 shows a block diagram of target file relative blocks.

FIG. 11 shows a block diagram of file blocks in a source volume.

FIG. 12 shows a block diagram of file relative blocks in a source volume

FIG. 15B shows an example of a Block Allocation Table (BAT) layout.

FIG. 18 shows a full backup of a file at a time T0.

FIG. 19 shows a first incremental backup of the file at a time T1.

FIG. 20 shows a second incremental backup of the file at a time T2.

FIG. 21 shows a synthetic full file backup at a time T3.

FIG. 26 shows a block diagram showing a merged distributed stream extents of a full backup followed by two incremental backups.

DETAILED DESCRIPTION

Figure 1:
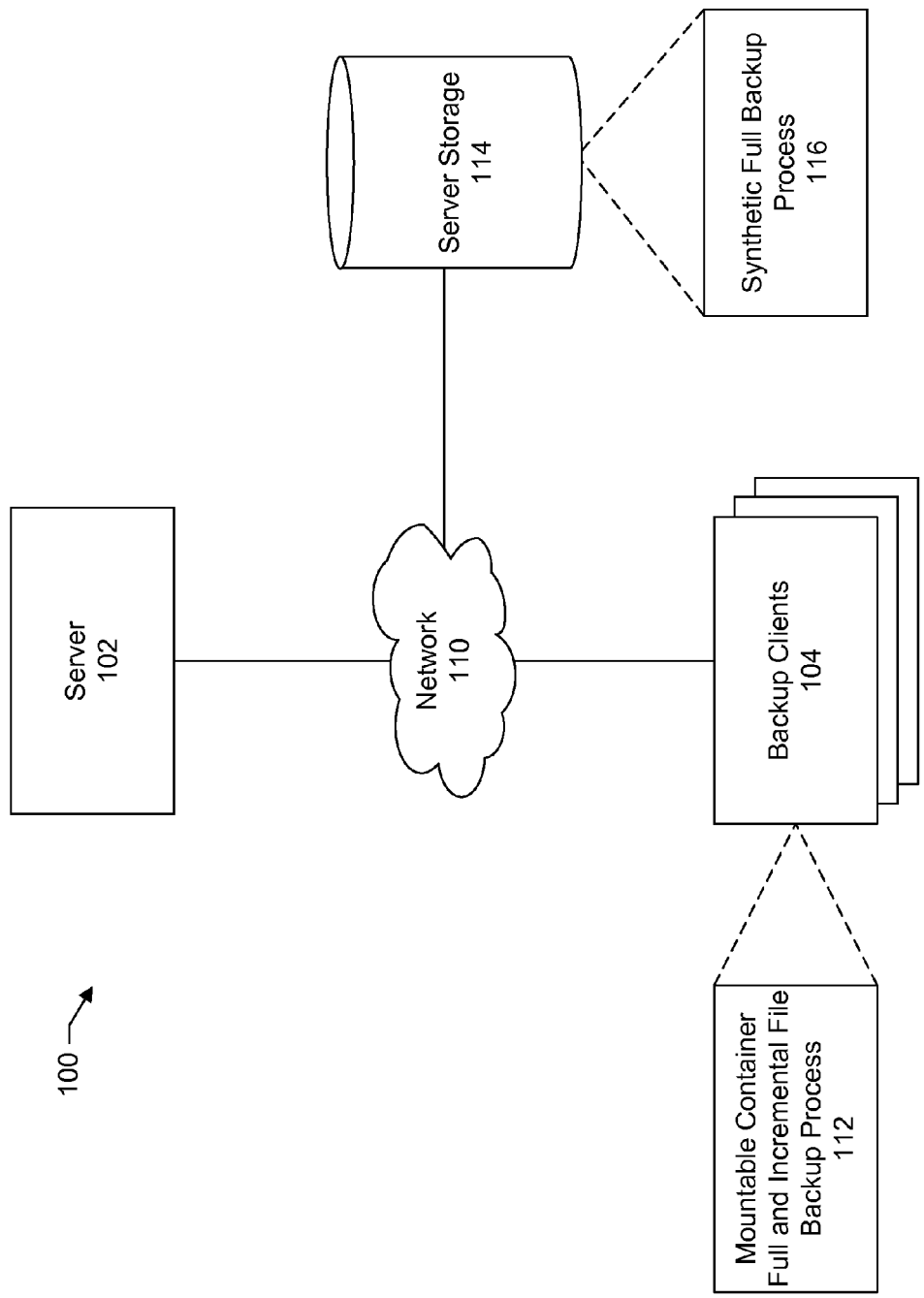
FIG. 1 is a diagram of a large-scale network implementing a data backup and recovery process that provides for full and incremental backups of one or more files and for the synthesis of a full file backup, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of a mountable container for performing full and incremental backups of one or more files and methods and systems for artificially creating a full backup of the one or more files that can be used as part of a disaster recovery solution for large-scale networks.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a mountable container for full and incremental file backups and synthesizing a full backup of a file. In system 100, a number of clients 104 are provided to serve as backup clients or nodes. A network server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in any number of persistent storage locations and devices, such as local client storage, server storage 114, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes a server 102, one or more backup clients 104 that execute a process 112 for a full backup of a file, an incremental backup of the file, or both, and storage server 114 that executes a synthetic full backup process 116 of a file.

In an embodiment, system 100 may represent a Data Domain Restorer (DDR)-based deduplication storage system, and storage server 114 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
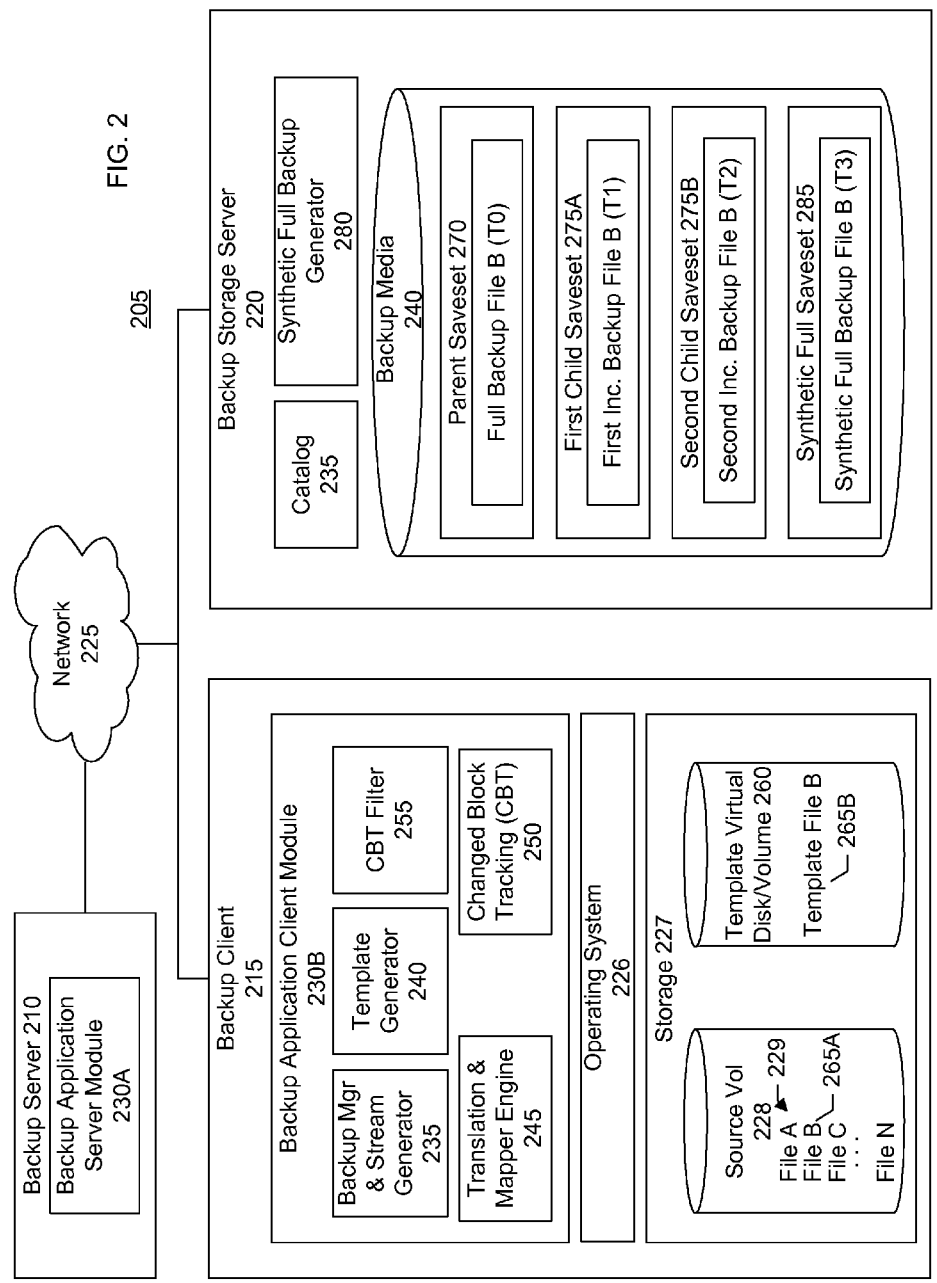
FIG. 2 shows an overall architecture of a system for backup and recovery.

FIG. 2 shows a system 205 for backing up one or more specific files from a client to a backup storage server in a mountable format. In other words, the backed up file can be presented to an operating system of a computer hosting the backed up file as a volume or mounted as a volume in the host computer. For example, in a Windows OS, the backed up file may be assigned a drive letter and may be accessed through the assigned drive letter.

In a specific embodiment, the file is backed up as a virtual hard disk file that may be formatted as a VHD (Microsoft Virtual Hard Disk Image) or Microsoft VHDx file (a Microsoft Hyper-V virtual hard disk). The VHDx format is a container format which can contain disk related information. VHDx files can be mounted and used as a regular disk. Volumes such as NTFS (New Technology File System), ReFS (Resilient File System), FAT32 (32-bit File Allocation Table), or any file system which the OS supports on the mounted disk can also be created. Differencing VHDx's can be created which will have internal references to the parent VHDx. Further discussion of the VHDx format is provided in "VHDX Format Specification," Version 0.95, Apr. 25, 2012, from Microsoft Corporation, and is incorporated by reference. The file to be backed up may be in any file format and the format may be the same as or different from the resulting backup file. For example, the file to be backed up may be formatted as a VHD/VHDx file, a Microsoft Exchange DataBase (EDB) file, a Microsoft SQL Server (MDF) file, Oracle database file (DBF), or any other file format.

As shown in the example of FIG. 2, this system includes a backup server 210, one or more backup clients 215, and a backup storage server 220, each of which are connected via a network 225. The network may be as shown in FIG. 1 and described above. The servers, clients, or both can be general purpose computers having hardware and software. For example, the client may include an operating system 226 (e.g., Microsoft Windows OS), and storage 227. The storage includes a volume 228 that stores any number of files 229 (e.g., file A, file B, file C . . . file N). Volume 228 may be referred to as a source volume.

Although FIG. 2 shows a single client, it should be appreciated that there can be any number of clients. For example, there may be tens, hundreds, or even thousands of clients to be backed up. Similarly, there can be multiple backup storage servers or nodes to help increase performance, provide redundancy, or both.

In a specific embodiment, there is a backup application that includes a backup application server module 230A and a backup application client module 230B. The backup application client and server modules communicate with each other to backup data on the client. For example, the backup application client module, when instructed by the backup application server module, backs up client data to the backup storage server or protection storage managed by the backup storage server. The backup storage server and protection storage may include disk, tape, a deduplication storage system (e.g., EMC Data Domain), or combinations of these.

A feature of the system shown in FIG. 2 allows for the backup of a single file (or a subset of files) from the source volume in or to a mountable format rather than the entire source volume. For example, volume image backups can be performed for full and incremental backups. Such backups can be advantageous in environments where there are millions of files to be backed up such as in High Density File System (HDFS) environments. Since volume backups read data from volumes and not from files, the number of metadata operations during backup is much less. Since I/O's are in sequential order, they also improve performance and use less resource.

In some cases, however, it is desirable to backup a single file or subset of files from the source file system in or to a mountable format rather than performing an entire volume block transfer. In particular, if only a file or a subset of files from the source file system has to be backed up in or to a mountable format, then significant space and time will be saved because other files in the source file system not needing backup will not be copied over to the backup storage server. In modern backup systems where the primary target is disk-based the option of mounting these backup images as it was in the source presents a major challenge. One example of a use case for near instant restore ready backups includes applications where read-write access is desired to achieve instant uptime of application files. For example, such features can be desirable for database type backups of, for example, Microsoft Exchange, SQL, SharePoint and Hyper-V which require the backups be exposed as files (source file system NTFS (New Technology File System/ReFS (Resilient File System), etc.) which have read write permission so that they replay logs and other activities to make the database online and consistent.

The system shown in FIG. 2 addresses the above problem in an efficient manner. The system can be used in scenarios where there is a need to backup a database (e.g., Microsoft Exchange database), or where there is an application in which it would be desirable to backup multiple files (e.g., two or more files) present in a particular folder on the source volume. Such files can be very large. The system can be used to backup data at the block-level, e.g., a block-based sub-file backup. As discussed in further detail below, the system backs up the used blocks of a file by identifying the file extents occupied by the file. A file extent is a contiguous area of storage reserved for a file in the file system, represented as a range, and a file can have zero or more extents. The file extents provide the starting offset and the length of the particular extent occupied by the file (e.g., an initial block address and the number of blocks that make up the extent). In other specific embodiments, the system further provides for incremental backups and artificially synthesizing full backups at the file or sub-file level.

In a specific embodiment, techniques are provided for creating a full and incremental backup of a target file by copying all or only changed blocks of the target file into a VHD/VHDx format. The software module (e.g., backup application client module) creates a VHD/VHDx stream which contains all the VHD/VHDx related metadata and the disk metadata such as MBR, GPT and the file contents on the fly, which is then streamed to the backup medium such as tape or disk targets as a single stream. The resulting saveset can then be mounted which will contain the file backed up for recovery purposes. The resulting VHD/VHDx file may contain only one backed up file, which makes it easier to chain incremental backups of a particular file, which will be linked to its parent.

The backup storage server includes a catalog 235 and backup media 240. The backup media stores data backed up from the clients. The backup media may be referred to as a target. The storage may be local to the server or may be external such as in the form of a deduplication appliance, or other storage configuration. The backed up data may include a volume, portion of a volume, applications, services, user-generated or user data, logs, files, directories, databases, operating system information, configuration files, machine data, system data, and so forth.

The catalog provides an index of the data stored on the backup storage server or protection storage managed by the backup storage server. The backed up data may be stored as a logical entity referred to as a saveset. The catalog may include metadata associated with the backup (e.g., saveset) such as an identification of the file or files stored on the backup storage server (e.g., globally unique identifier (GUID) of a backed up database), the time and date of backup, size of the backup, path information, and so forth.

In the example shown in FIG. 2, a file B 265A residing on the source volume has been backed up at a time T0 and saved to the backup media as part of a saveset 270. In this example, the backup is a full backup of the file and saveset 270 may be referred to as a "parent" saveset. The backup media may further include any number of incremental backups for a particular file which are linked to the parent backup of that particular file. These incremental backups may be stored as separate savesets and may be referred to as "child" savesets. For example, FIG. 2 shows a first child saveset 275A, and a second child saveset 275B which are linked to parent saveset 270. The first child saveset includes a first incremental backup of file B taken at a time T1 after time T0. The second child saveset includes a second incremental backup of file B taken at a time T2 after time T1 and T0.

FIG. 3, shows an example of the block based backup image format within a VHD/VHDx formatted file. The stream layout for volume backup shown in FIG. 3 includes a master boot record (MBR) 305, a GUID partition table (GPT) 310, a GPT primary entries section 315, a disk and volume contents section 320, a GPT entries section 325, and a GPT header section 330. The data of the backed up file is stored in the disk and volume contents section. In a specific embodiment, one volume is embedded in one VHD container. The GPT partitioning style helps to avoid disk signature collision when the virtual disks are mounted. The GPT partitioning style is supported in both the client and server versions of, for example, the Microsoft Windows 8 platforms.

Referring back to FIG. 2, in a specific embodiment, the backup application client module includes a backup manager and stream generator 235, a template generator 240, a translation and mapper engine 245, a changed block tracker (CBT) driver 250, and a changed block tracker filter 255. The backup storage server includes a synthetic full generator 280.

The backup manager is responsible for coordinating the various components of the backup application client module including creating a block-based backup stream for the data to be backed up. The template generator is responsible for creating a template virtual disk or volume 260 on the client that corresponds structurally to source volume 228. The template virtual disk/volume may be referred to as a backup container from which the block-based backup is streamed.

The translation and mapper engine (which may be referred to as a file/block extents mapper engine) is responsible for converting or managing the translation from virtual cluster numbers (VCNs) to logical cluster numbers (LCNs) or converting from Target Logical file blocks (TLFB) to Target file relative blocks (TFRB) when a data block of the file needs to be read from disk for backup. File data is read from the file residing in the source volume (TFRB to Source File Relative Blocks (SFRB)). In other words, a mapping may be performed to translate, correlate, or convert between high-level logical identifiers and lower-level identifiers of data. In a specific embodiment, the conversion is facilitated by the file system application programming interface (API) FSCTL_GET_RETRIEVAL_POINTERS as provided by the Windows OS.

The changed block tracking (CBT) driver is responsible for tracking the blocks that have changed in a volume since the last backup. The CBT is an OS driver module that tracks the writes to a particular volume. The CBT driver can provide all the cumulative changes of a volume since the last backup. The CBT driver can identify, for a particular volume, the blocks that have changed since the last backup. This includes changes that include more than one file. The CBT driver can monitor changes since the last file backup. The CBT filter is responsible for filtering the set of changed blocks provided by the CBT driver in order to identify the changed blocks associated with the file or set of files to be incrementally backed up.

The synthetic full generator is responsible for merging one or more incremental backups of a parent backup of a file to generate a synthetic full saveset. In the example shown in FIG. 2, the synthetic full generator has merged first and second incremental backups of backed up file B with the parent backup of file B to create a synthetic full saveset 285 at a time T3, after times T0, T1, and T2.

The components of the backup system shown in FIG. 2 are functional entities where the implementation of the functions may vary. For example, in some cases the backup manager stream generator and template generator are combined into one code module. In other cases, the generators reside in separate code modules. A component of the backup application client module may function at the application program level or the operating system level in order to carry out its functions.

Figure 4:
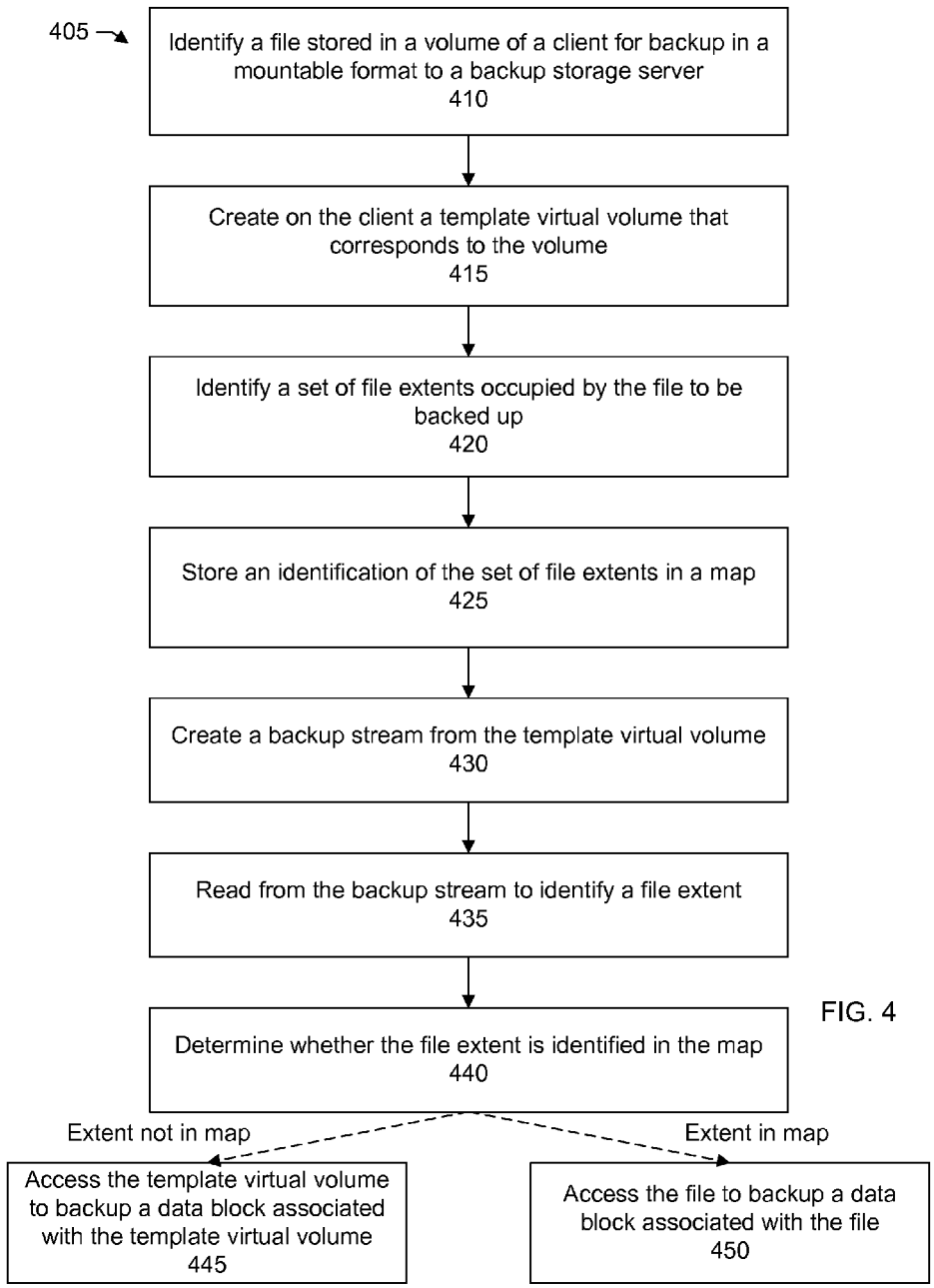
FIG. 4 shows a flow diagram for backing up one or more files in a mountable format.

FIG. 4 shows an overall flow 405 for backing up one or more files from a client to a backup storage server in or to a mountable format. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, one or more files stored in a volume of the client are identified for backup in or to a mountable format to the backup storage server. For example, the backup server may generate and send to the client a backup request specifying the file to backup. The client receives the backup request and parses the request to determine the file to be backed up.

In a step 415, a virtual volume is created on the local client with one or more files that emulate the one or more files to be backed up. The template generator creates on the client a virtual volume that corresponds to the volume in which the file to be backed up is stored. This virtual volume may be referred to as a template, dummy, or container. The container can be used to store objects in an organized way following specific access rules. The container can be a class, a data structure, or an abstract data type. In a specific embodiment, the virtual volume is referred to as a VHD/VHDx container. That is, in a specific embodiment, the virtual disk or volume includes the VHD/VHDx format.

Creating a correspondence between the virtual volume and the volume storing the file to be backed up includes creating a file system on the virtual volume that is similar to the file system of the source volume having the one or more files to be backed up. More particularly, creating the correspondence includes replicating in the virtual volume the directory structure in the volume associated with the file and creating a template file that corresponds to the file to be backed up. The virtual volume, and in particular the template file, however, do not include the actual data of the file to be backed up. That is, they are blank, empty, or without the actual data of the file.

Thus, the virtual volume may be referred to as a dummy volume or dummy VHD/VHDx and represents a temporary or interim data storage element. The template file may be referred to as a dummy file. These dummy files help to ensure a recreation of the exact virtual disk structure to be backed up. During the backup cycle, only the metadata information in the virtual disk is copied from the template file (e.g., dummy VHD/VHDx file). The actual data of the file to be backed up is read from the file extent on the actual source volume. When the backup is complete, the dummy virtual disk and dummy files can be deleted from the local client. The dummy virtual disk and dummy files are temporary constructs used during the backup operation.

In a step 420, the backup manager identifies a set of file extents occupied by the one or more files in the source volume to be backed up. In a step 425, the identified set of file extents are stored in a map. The map may be stored at the local client. The map thus identifies the source extents occupied by the files. During the actual backup, these file extents will then be read by the backup manager.

In other words, the used blocks of a file are backed up by identifying the file extents occupied by the file. The file extents provide the starting offset and length of the particular extent occupied by the file. Typically, the file extents of a particular file will not necessarily be contiguous. The system obtains the extents occupied by the file with respect to the volume storing the file. Consider, as an example, that the particular file to be backed up occupies ten extents. The system creates or maintains a map that includes a starting offset and the length for each extent of the ten extents.

In a step 430, the backup manager creates a stream or backup stream from the virtual volume. In a step 435, the backup manager reads from the stream to identify a file extent. In a step 440, the backup manager determines whether the file extent is identified in the map. In a step 445, if the extent is not in the map the backup manager accesses the template virtual volume to backup a data block associated with the template virtual volume. Alternatively, in a step 450, if the extent is in the map the backup manager accesses the file to backup a data block of the file. The creation of the virtual volume container and template file facilitates the backing up of metadata (e.g., directory structure information) associated with the file to allow the backed up file to be mounted as a virtual hard disk.

Figure 5:
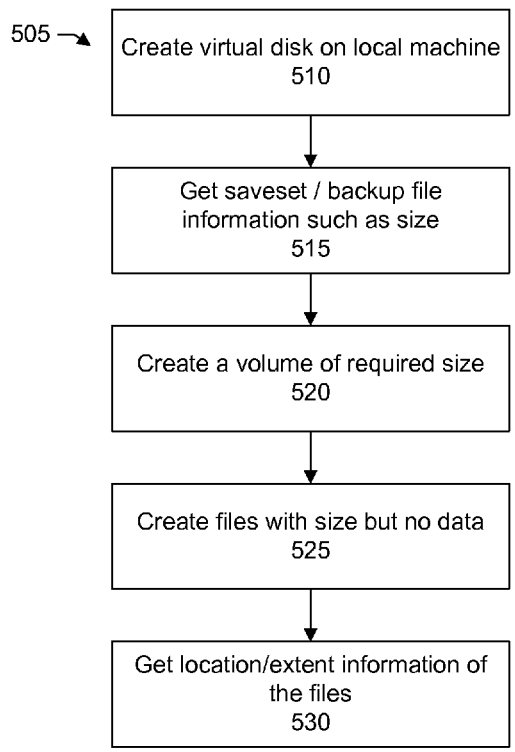
FIG. 5 shows a flow for creating a virtual disk container.

FIG. 5 shows a more detailed flow 505 for creating the corresponding template virtual volume including a template file in the virtual volume for each file to be backed up. In a step 510, a virtual disk or volume is created on the local machine. For example, as shown in the example of FIG. 2, there is a virtual volume 260 that has been created on the client. The virtual volume is formatted with a file system of the volume storing the file to be backed up. For example, if source volume 228 that stores the file to be backed up is an NTFS file system, virtual volume 260 is formatted with NTFS.

In a step 515 (FIG. 5), saveset or information about the file to be backed up is obtained. The information includes a size or current size of each file in the volume to be backed up. In a step 520, the virtual volume is sized based on the total size of the files in the volume to be backed up. That is, the virtual volume is sized to accommodate the total size of the files to be backed up. For example, the system may add or sum the file sizes of each backup file to compute the total size of the backup files. The size of the virtual volume may be set so that it is equal to or greater than the total size of the backup files.

In a step 525, the template generator creates for each file in the volume to be backed up a template file in the virtual volume having a size that matches the corresponding backup file size, but where each template file is without data. The filenames of these template or dummy files may be set to some dummy values. For example, FIG. 2 shows an example in which a file B 265A stored in the source volume has been identified for backup. A corresponding template file B 265B has been created in the virtual volume.

Thus, the number of template or dummy files created in the virtual volume may be equal to the number of files in the source volume that are to be backed up. For example, if a single file has been identified in the source volume for backup, a single corresponding template file may be created in the virtual volume. If two files have been identified for backup, two corresponding template files may be created in the virtual volume, and so forth.

Similarly, the size of the template or dummy file is configured to be equal to the size of the corresponding size of the file in the source volume to be backed up. For example, if file B 265A (FIG. 2) has a size of Y bytes, the size of corresponding template or dummy file B 265B will be configured to have a size of Y bytes. Thus, the extents for that particular dummy file will have been created, but the extents will not contain the actual data of the file to be backed up. During the backup operation, when there is a read of the actual data the read will be from the source. When, however, there is metadata associated with the backup file to read, the read will be from the dummy file or disk.

The total number of files in the source volume may be different from the total number of template files in the virtual volume. For example, the total number of files in the source volume may be greater than the total number of template files in the virtual volume when, for example, only a subset of the files in the source volume are to be backed up. Directories are created on the local virtual volume that replicate or match the exact directory structure of the given file path of the file to be backed up. The template generator creates within the virtual volume a directory structure that matches a directory structure of the file (or volume storing the file) to be backed up.

In a step 530, the backup manager obtains location and extent information of the file to be backed up. The file extents associated with the backup file are gathered and stored or updated in a known extents table.

Table A below shows a specific embodiment of a flow for creating the template virtual disk and volume with files.

TABLE A

| STEP | DESCRIPTION |
| --- | --- |
| 1 | Create VHD/VHDx container on the client machine equal to the source volume disk |
| 2 | Mount the VHD/VHDx |
| 3 | Create volume |
| 4 | Query volume offset relative to disk (a), e.g., store the volume offset value in a variable (a) |
| 5 | Create the directory and the file, e.g., create template file in the VHD/VHDx container |
| 6 | Set attributes and security information |
| 7 | Get free clusters of the source |
| 8 | Reserve file clusters for the largest file size possible on the source volume |
| 9 | Query extents reserved for file (b), e.g., store the value in a variable (b) |
| 10 | Add (a) offset to list (b) and store it (c), e.g., store the sum in a variable (c) |
| 11 | Sync the file system, e.g., synchronize the file system of the VHD/VHDx container to the file system of the source volume. |

Synchronizing the file systems involves creating or generating a file system structure that is similar to that of the source volume. Consider, as an example, a database file to be backed up resides in the directory "C:\Microsoft\database\file1." A similar file system is then created within the dummy virtual disk (e.g., VHD/VHDx container) that includes the same directory structure, e.g., Microsoft\database. A dummy file, e.g., dummy_file1, is then created within the Microsoft\database folder that has a size equal to "file1." Using the dummy virtual disk and file during the backup operation facilitates recoveries by helping to ensure that the particular backup file includes a file structure similar or identical to the source volume. In a specific embodiment, the file system structure thus created in the template volume is brought to a consistent state by flushing file buffers. This can be achieved by system calls/APIs such as fsync (UNIX), or FlushFileBuffers (Windows).

Figure 6A:
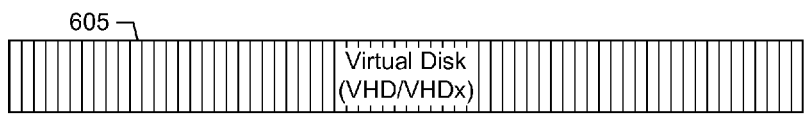
FIG. 6A shows a block diagram of a virtual disk.
Figure 6B:
FIG. 6B shows a block diagram of a volume on the virtual disk.
Figure 6C:
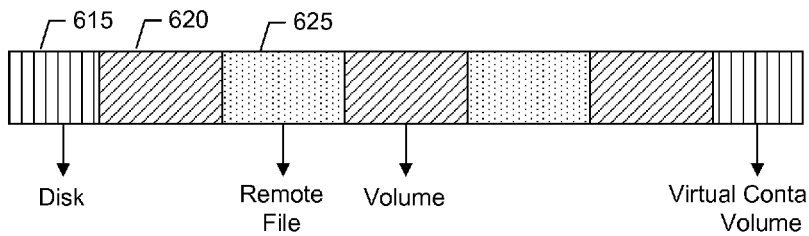
FIG. 6C shows a block diagram of various sections of the volume.

FIGS. 6A-C are block diagrams showing the template or dummy virtual disk. In particular, FIG. 6A shows a virtual disk 605 as created on the local client. In a specific embodiment, the virtual disk includes a VHD/VHDx format. FIG. 6B shows a volume 610 created within the virtual disk. FIG. 6C shows various sections of the virtual disk and volume. Sections 615 having a pattern of vertical lines represent disk information or virtual container/volume information. Sections 620 having a pattern of diagonal lines represent the volume information of the virtual disk. Sections having a pattern of dots 625 represent the extents of the template file corresponding to the file to be backed up.

More particularly, after creating a template or dummy virtual disk similar to the volume containing the file to be backed up, extents of the file in the source volume are located and stored in a vector of file extents. During the backup process while the dummy virtual disk is read, if the read happens to be in the region having the pattern of vertical lines (615), it would correspond to the disk information which is read from the dummy disk as it is. So is the case when the read is in the region depicted as having the pattern of slanted lines (620). This is the volume information of the virtual disk.

When the read is identified to be in regions 625 (dotted pattern), the read is done from the actual file to be backed up. The actual read is not done from the dummy volume but is done from the actual file on the snapshot of the source volume. In other words, the actual read is done on the file that is remote from the dummy volume, i.e., the file on the client to be backed up. This process involves conversion from virtual cluster numbers (VCNs) to logical cluster numbers (LCNs) (TLFB to TFRB). This data has to be eventually read from the file residing in the source volume (TFRB to SFRB). This conversion is achieved by file/block extents mapper engine shown in a flow 705 of FIG. 7.

As shown in FIG. 7, in step 710, a source file list is identified. The list includes the one or more files to be backed up. In a step 715, source file/block extents occupied by the source files are gathered. In a step 720, the file/block mapper engine is called to convert from VCNs to LCNs. A process of the conversion is shown in the example below.

1 Target File Relative block: (1 MB, 512), (3 MB, 1024), (5 MB, 512)

2 Source File Relative Blocks: (0, 512), (512, 1024), (1536, 512)

Here, a first value in the pair represents offset. A second value of the pair represents the length. 1 represents target volume extents, and 2 represents the corresponding file extent.

FIGS. 9-10 are block diagrams showing the extents (including starting offset and length) of a particular file, e.g., file 1. The extents of the particular file may be spread across the source file system and will include different offsets. FIG. 9 shows file blocks in the target volume. FIG. 10 shows target file relative blocks. FIG. 11 shows file blocks in the source volume. FIG. 12 shows file relative blocks in the source volume. In the example shown in FIGS. 9-10, file 1 includes first, second, and third extents 910, 915, and 920, respectively. Each extent has been filled with a particular pattern to identify the extent. For example, first extent 910 is drawn with a pattern of slanted lines. Second extent 915 is drawn with a pattern of dots. Third extent 920 is drawn with a pattern of cross-hatches.

A query is executed to identify the extents occupied by the particular file to be backed up. The query results including the starting offsets and lengths are received and stored in a map. The extents may be arranged so that they present in a contiguous location in the actual destination volume. For example, in the target file relative block, there is the first extent which is immediately followed by the third extent, starting at offset 16. Thus, even though the extents may be spread across different offsets, they are read from a particular location and placed in a contiguous location in the actual destination.

Referring now to FIG. 7, in a step 725, the file/block and volume backup stream generator streams 730 a VHD/VHDx stream to a backup media 735. More particularly, once a backup is initiated, the backup manager examines or analyzes an extent to determine whether the extent lies within the extents occupied by the file to be backed up. If the extent lies within the extents occupied by the file, the data block associated with the extent is then copied (e.g., backed up).

This process includes converting the extent to the logical file extent of the file on the actual source file system to backup those particular blocks of the file. That is, there is a conversion of the data to be read from the actual extent to the file extent present in the volume. The mapper engine converts the actual data to be read with respect to the current volume offset to identify where exactly the data has to be read to the backup file extents occupied by the current file to be backed up. If the offset resides in that particular file block, the backup manager reads from that particular file block. If the extent is outside of the extents occupied by the file, the copy is made from the template or dummy virtual disk, e.g., read from dummy VHDx. After the backup process is complete, the dummy VHDx can be deleted.

FIG. 8 shows another example of a flow 805 for processing the backup of a file to a VHD/VHDx format stream. A step 810 indicates a start of a read. In a step 815, the volume offset and length are obtained. In a step 820, a check is made as to whether the offset is within the file boundary. If the offset is not within the file boundary, in a step 825, a read is made of the volume (e.g., the virtual volume). The read operation then ends 830 and may loop back 835 to the start of a next read. Alternatively, if the offset is within the file boundary, in a step 840, a determination is made of the file offset from the volume offset. The flow then proceeds to a step 845 in which data is read from the remote backup file from the file offset (e.g., a read of the data block of the file to be backed up).

Table B below summarizes some steps involved in the file and volume backup stream process.

TABLE B

| STEP | DESCRIPTION |
|---|---|
| 1 | Create block based backup stream from backup container |
| 2 | Read from stream |
| 2a | Check if file extents are present in stream boundary (i.e., check whether the data currently to be backed up resides in the boundary of the files identified for backup) |
| 2b | If yes:<br>i) Convert TLFB to TFRB (Target Logical File Blocks to Target File Relative Blocks)<br>ii) Convert TFRB to SFRB (Target File Relative Blocks to Source File Relative Blocks)<br>iii) Read from source file |
| 2c | Else:<br>i) Read from backup container volume |
| 3 | Write to target stream in sequential order |
| 4 | End backup |
| 5 | Commit various attributes to the media for subsequent incremental backups such as<br>a. VOLUME_SIZE<br>b. VOLUME_START_OFFSET<br>c. VDISK_SIZE<br>d. VDISK_SECTOR_SIZE<br>e. VDISK_LOG_SECTOR_SIZE<br>f. FILE EXTENTS: ex: 4 MB:16 KB, 16 MB, 32 KB<br>g. SFILE_SIZE: 48 KB<br>h. SFILE_MAX_SIZE: 10 GB<br>i. RELATIVE_PATH_ON_TARGET: ..\..\10.\31\GUID |

Some benefits of the system include the ability to mount the resulting backup image directly using, for example, the standard Microsoft Windows VHD/VHDx mount API; support for any target media in addition to disk-based as the backup is stream-based; support for file level restores in the case of a non-disk medium such as tapes provided extents are known; instant access of the backup file to the host in a native file system with recovery being instantaneous; no need to hop through for recovery; and the backed up file can be exposed directly to any host to help ensure that recovery time objectives (RTO) are met.

Referring back to FIG. 2, a feature of the system further provides for incremental backups at the file or sub-file level. In other words, rather than performing an entire volume block transfer, only a file, its incremental file blocks, or both may be copied. Incremental file blocks are only those changes from a last backup. Changes may include a block that has changed since the last or previous backup, a new block since the last or previous backup, or both. Copying only the changed blocks of the desired file to backup is especially advantageous where the file is very large and constantly or continuously grows or increases in size as time progresses. It is desirable to backup only incremental file changes because sub-file backups are faster than performing an entire volume block transfer. In addition to conserving network bandwidth, storage space on the backup media is also saved because only changed blocks of a file may be backed up. Once a particular file has been backed up, it is desirable to be able to perform subsequent incremental file backups to backup changes to the file.

For example, as shown in FIG. 2, the backup manager with the assistance of the changed block tracker and filter has backed up to the backup media incremental changes made to file B. In particular, first child saveset 275A includes first incremental backup file B taken at time T1. More particularly, the first child saveset includes changes made to file B between a time of the previous backup (e.g., T0) and T1. Blocks of file B that have not changed between time T0 and T1 may not be included with the saveset. In other words, the unchanged blocks of the file may be excluded from the saveset.

Second child saveset 275B includes second incremental backup file B taken at time T2. More particularly, the second child saveset includes changes made to file B between a time of the previous backup (e.g., T1) and T2. The previous backup may be a last backup or a backup immediately before the current backup. Blocks of file B that have not changed between time T1 and T2 may not be included with the saveset. Thus, subsequent incrementals may include a differencing disk that includes one of a block from a current version of the file that has changed with respect to a previous version of the file or a newly occupied block from the current version of the file, where the newly occupied block is not in the previous version of the file.

Figure 13:
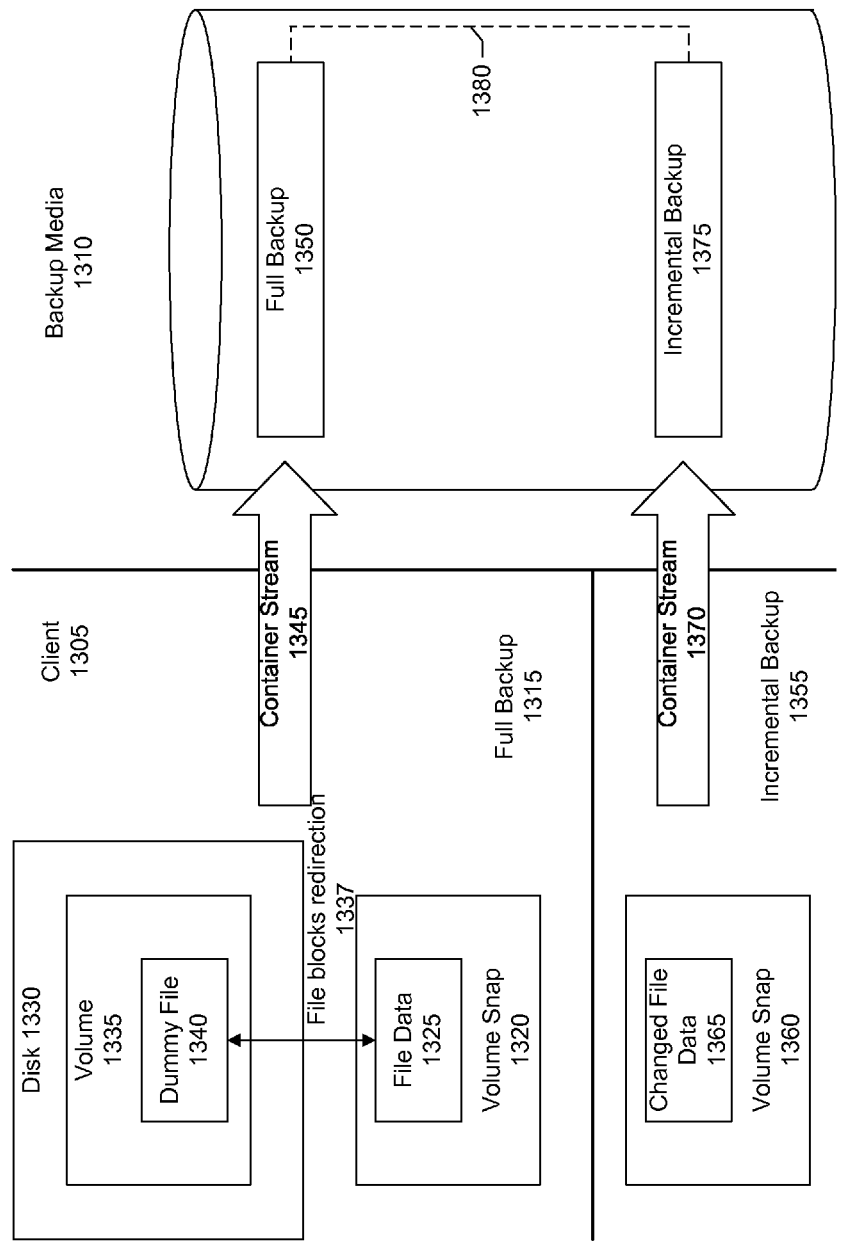
FIG. 13 shows a schematic of a full and incremental backup.

FIG. 13 is a simplified block diagram showing the overall process of a container based mountable single file backup including an incremental file backup. There is a client 1305 and a backup media 1310. At a time T0 a full backup 1315 of a particular file is performed. To perform the full backup, there can be a volume snapshot 1320 of the source volume which includes data of a file 1325 for backup.

A template or dummy virtual disk 1330 is created along with a dummy volume 1335 and dummy file 1340. In other words, a backup volume is created on the client machine with the required parameters for which the file is to be backed up. In particular, in a specific embodiment, a virtual disk of a dummy VHD/VHDx container is created at the client. An NTFS or ReFS volume is created on the disk. A dummy file is created within the volume that represents the file to be backed up. The dummy file, however, is not a copy of the file to be backed up because the dummy file will not include the file data.

File blocks are redirected 1337 depending on whether the backup of a particular block is associated with metadata (e.g., virtual disk information, or volume information of the virtual disk) or actual data of the file. If the block is associated with metadata, the backup reads from the virtual disk. If the block is associated with actual file data, the read is from the source volume. The block is then streamed in a container stream 1345 to the backup media and stored as a full backup or saveset 1350. The full saveset may be referred to as a parent.

In other words, during the container streaming of the VHD/VHDx container, the system interprets, analyzes, or examines a particular extent of the VHD/VHDx stream. If the particular extent is associated with the dummy file, rather than reading from the dummy file, the system reads from the file data that is residing on the volume snapshot.

A snapshot of the volume may be taken to initiate changed block tracking of the volume. After time T0, changes may be made to the file. For example, information may be added to the file, deleted or removed from the file, modified or altered in the file, or combinations of these. At a time T1, after time T0, an incremental file backup 1355 is performed. To perform the incremental backup, there can be another volume snapshot 1360 of the source volume which includes changed file data 1365.

During an incremental backup a dummy file corresponding to the file to be incrementally backed up does not have to be created because the system stores or can determine exactly where the file starts in the full or parent VHD/VHDx. In other words, the structure associated with the file has been stored in the previous full backup of the file. Thus, the data blocks to be streamed in an incremental backup can include the blocks of the file and blocks associated with metadata of the file (e.g., directory structure information, disk information, or volume information) can be excluded from the stream.

The set of changed blocks since the previous backup of the file at T0 are filtered to identify changed blocks associated with the file and exclude other changed blocks of the volume not associated with the file to be backed up. The changed data blocks of the file are streamed in a container stream 1370 to the backup media and stored as an incremental VHD/VHDx in an incremental backup or saveset 1375. The incremental saveset may be referred to as a "child" and is linked or associated 1380 to the full or "parent" saveset.

More particularly, as discussed above, the changed block tracking driver tracks changes to particular volume. However, not all the changed blocks of a volume may be relevant to an incremental backup of a particular file because the volume may include other files that have also been changed. The system can identify the blocks occupied by the particular file to be backed up and backup only those changed blocks.

Other changed blocks of the volume identified by the CBT driver that may be associated with other files not of interest may be excluded from the incremental backup of the particular file (or files) of interest. In a specific embodiment, identifying the blocks occupied by the particular file includes calling or querying an API (e.g., Windows API) to obtain the extents occupied by the particular file. The system can then perform a comparison or cross-referencing between the information returned by the API regarding the extents occupied by the particular file and the set of changed blocks of the volume identified by the changed block tracking driver to identify which changed blocks are associated with the particular file.

In a specific embodiment, a child VHD/VHDx file is created on the backup media target for the parent VHD/VHDx file which was saved during the previous full backup of the file. Blocks of the file that have changed since the last backup (e.g., last full or incremental backup) are stored as part of the child VHD/VHDx. In other words, in a specific embodiment, a method includes receiving from the CBT information identifying a set of changed blocks. The set of changed blocks are blocks on a volume that have changed since a previous backup. The previous backup may be a full or incremental backup.

The CBT driver tracks the changed blocks at the volume level. A subset of the set of changed blocks is identified in order to perform a backup at the file or sub-file level. More particularly, the changed blocks in the subset are changed blocks occupied by the particular file of interest on the volume to be backed up. The set of changed blocks may be filtered where the filter criteria includes information identifying blocks associated with the file of interest. Changed blocks associated with the file of interest are included in the subset of changed blocks. Changed blocks not associated with the file of interest are excluded from the subset and may not be streamed or backed up to the backup storage server.

A child VHD/VHDx is created for the subset of changed blocks and chained or linked to the parent VHD/VHDx file. Consistency with respect to a particular file can be maintained because the parent (or full) saveset and child (or incremental) saveset will include blocks associated with that particular file. Blocks not associated with that particular file, such as blocks from other files not of interest, will be excluded or omitted from the parent and child savesets.

Figure 14:
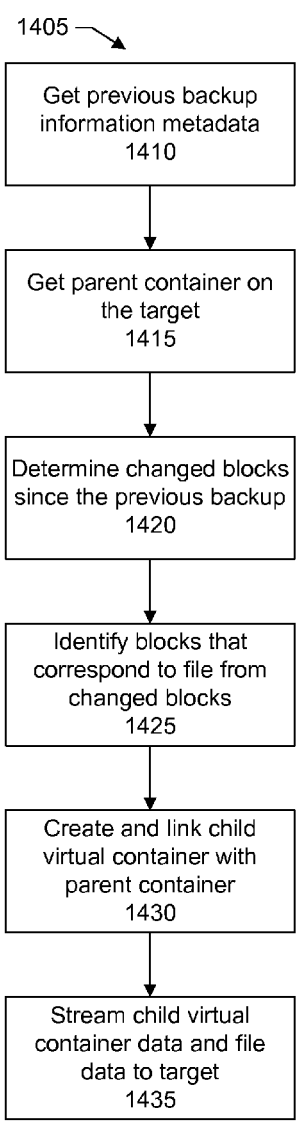
FIG. 14 shows a flow for an incremental backup of a file.

FIG. 14 shows an overall flow 1405 for an incremental backup of a file. In a step 1410, previous backup information metadata is obtained. The previous attributes obtained may include the source volume size, volume start offset, and file extents relative to the volume. In a step 1415, the system obtains the parent container on the target. For example, the system may obtain an identifier associated with the parent saveset on the backup media.

In a step 1420, the backup manager determines the changed blocks since the previous backup. In a step 1425, the backup manager identifies blocks that correspond to the file. More specifically, a listing or identification of changed blocks is provided by the changed block tracker. The backup manager obtains a changed block bitmap for the file, the current size of the file, and generates incremental file relative blocks relative to previous backup.

The steps for the incremental backup may be as shown in Table B above. In particular, the incremental backup workflow process includes a conversion from virtual cluster numbers (VCNs) to logical cluster numbers (LCNs). The logic for this conversion is the same as the conversion logic used for a full backup of a file. However, rather than backing up all the blocks occupied by the file (or files), changed blocks returned by the CBT volume filter driver, are scanned to identify the modified blocks corresponding to the file. Only these blocks are used to create a differencing disk of the previous virtual disk, thus creating a chain of differencing disk containing the delta changes.

In a step 1430, the backup manager creates a link between the child virtual container with the parent container. In a step 1435, the backup manager streams the child virtual container data and file data to the target (e.g., backup media). In particular, the backup manager prepares an incremental target volume stream in reference to a previous backup, links to the previous backup, and places file blocks as appropriate with respect to the target stream.

Figure 15A:
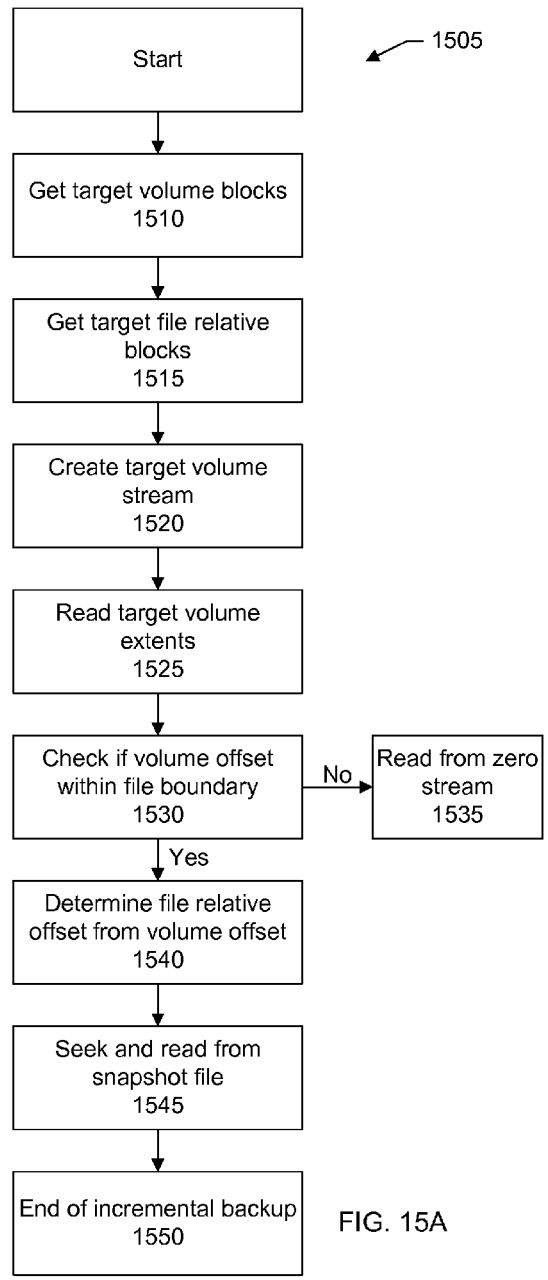
FIG. 15A shows another flow for an incremental backup of a file.

FIG. 15A shows a more detailed flow 1505 of a technique for an incremental file container backup stream process. The flow shows the steps to merge delta file blocks into an incremental target volume stream. In a step 1510, the system obtains the target volume blocks. In a step 1515, the system obtains target file relative blocks. In a step 1520, the system creates a target volume stream. In a step 1525, the target volume extents are read. In a step 1530, a check or determination is made as to whether the volume offset is within the file boundary. In a step 1535, if the volume offset is not within the file boundary, the system reads from a zero stream. Alternatively, in a step 1540, if the volume offset is within the file boundary the system determines the file relative offset from the volume offset. In a step 1545, a seek and read is performed from the snapshot file. In a step 1550, the incremental backup ends.

Some benefits of the system with regard to incremental backups include very fast incremental backups because only changed files are backed up rather than the entire volume; granular restores from incremental backups; instant access of a file or set of files with recovery is instantaneous or near instantaneous if the target is disk; a backup method that is also suitable for a sequential backup medium such as tape-based backups; and optimized or improved backup for deduplication targets.

Referring now to FIG. 2, a feature of the system further provides for artificially creating at the backup storage server a current full backup of a file. The artificially created full backup may be referred to as a synthetic full backup. Synthetic full generator 280 can merge a previous full backup of a file (e.g., a full backup of file B taken at time T0) with one or more incremental backups of the file (e.g., first incremental backup of file B taken at time T1, second incremental backup of file B taken at time T2, or both) to create a synthetic full backup of file B. In other words, the synthetic full generator may merge a previous full backup of a file and one or more incremental backups of the file to create a synthetic full backup of the file.

Techniques for synthesizing full backups are applicable and advantageous in backup systems that provide for incremental backups. For example, over time there may be an increasing number of incremental backups stored at the backup storage server (or other centralized server). These backup copies are dependent savesets. That is, they depend on the previous backup copy and cannot be recovered separately or without the previous backup copy. The number incremental backups is inversely proportional to recovery performance. Thus, as the number of incremental backups increases the restore performance decreases. Further, the management of separate incremental savesets in the media (e.g., managing retention periods and expiration times and dates) becomes cumbersome.

Some advantages of the system shown in FIG. 2 with respect to the synthetic full feature includes enhancing restore performance, particularly when a given full backup cycle contains many incremental backups; conserving computing resources such as in cases where the remote media is too slow or is not well-suited to take a periodic full backup; and facilitating periodic archiving to tape (e.g., weekly archiving to tape). For example, when archiving or sending to tape, the system may consolidate a full backup and any number incremental backups (e.g., 1, 2, 3, 4, 5, 6, 7, or more than 7 incremental backups). In a specific embodiment, the synthetic full operation of existing full backups and incremental backups runs on the storage or the media server—the processing is not done at the client node. Running the synthetic full operation on the storage or media server allows the client to perform other tasks (e.g., servicing production requests). In another specific embodiment, the synthetic full operation may be run on the client if desired.

Further benefits of the system include preserving the existing full and incremental block based file backups. Preserving the existing full and incrementals can allow for rollbacks to particular points in time. Support is provided for the creation of an incremental block based file backup before running a synthetic full so that any recent changes are captured in the incremental backup. Support is provided for the creation of only synthetic full file block based backup from existing full and incremental block based file backups. Support is provided for immediate creation or for scheduling a synthetic full operation at a later date. The merge operation of existing full and incremental block based file backups may be done "on the fly" (i.e., during runtime of the backup operation) and can be streamed to any backup media such as tape or again to a disk. Block level file restores can be done from the synthesized full backup. Individual file level restores can be done from the synthesized full block level file backup. Cloning to a different target and stage to a different target can be performed of the synthesized full block level file backup. A data domain native virtual synthetics feature may include not reading from the existing full and incremental file backup only offsets are rebased to the new synthetic full. This enables fast synthetic full.

Full and incremental file changes may be scattered across multiple backup copies. In a specific embodiment, an artificial or synthetic full backup of a file is created by inspecting each of the backup copies and merging those. The virtual disk format allows changes to be represented within the format itself in terms of sector bitmap and Block Allocation Table (BAT).

The artificial full backup of the file can be created without altering the backup copies. Consider, as an example, a scenario where there is a full backup (e.g., parent VHDx) followed by two incremental backups (e.g., two differencing or child VHDxs'). A synthetic full operation is performed involving the parent and child VHDxs'. The synthetic full operation, however, does not alter or modify the parent disk. After the synthetic full operation, the parent VHDx is still available. In other words, the parent VHDx before the synthetic full operation may be the same as the parent VHDx after the synthetic full operation. The parent VHDx before the synthetic full operation may be identical to the parent VHDx after the synthetic full operation. In a specific embodiment, the parent VHDx (or a copy of the parent VHDx) is preserved during the synthetic full operation. Preserving the parent VHDx (or a copy of the parent VHDx) allows for intermediate recoveries. For example, after a synthetic full operation involving the parent VHDx and the two child VHDxs, an administrator may perform another synthetic full operation to generate another synthetic full backup including the parent VHDx and the first child VHDx, but not including the second child VHDx.

FIG. 15B shows an example of a BAT layout. The BAT is a region having a single array of 64-bit values, with an entry for each block that determines the state and file offset of that block. The entries for the payload block and sector bitmap block are interleaved in a way that the sector bitmap block entry associated with a chunk follows the entries for the payload blocks in that chunk. For example, if the chunk ratio is 4, the table's interleaving would be as shown in the example of FIG. 15B. Other layouts and configurations are also possible.

Figures 16A, 16B:
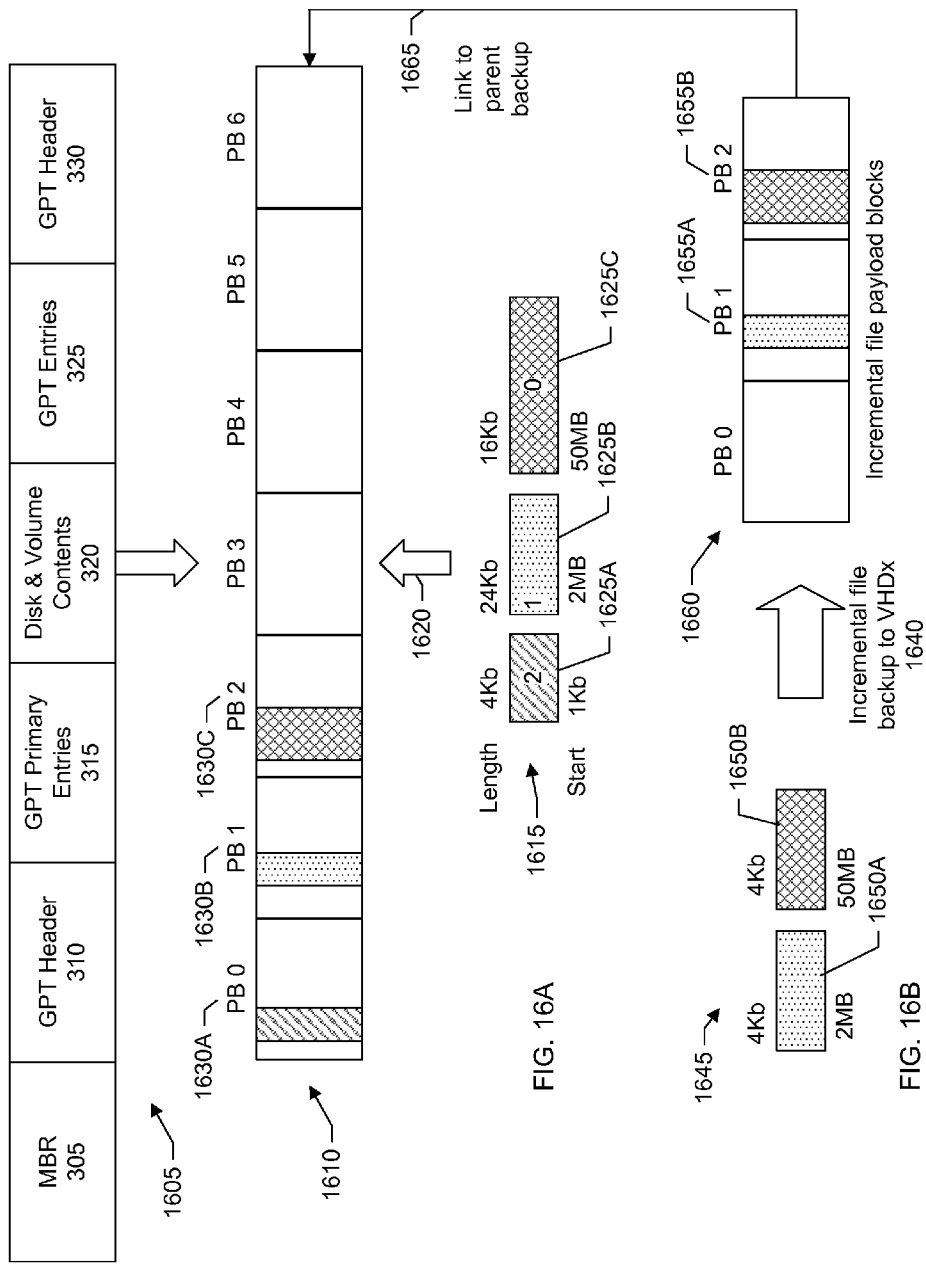
FIG. 16A shows the structure or layout of a virtual hard disk.
FIG. 16B shows an incremental backup of file blocks.

FIG. 16A is a block diagram showing the structure or layout of a virtual hard disk file such as a VHDx file under an example embodiment. Although specific example formats and configurations are shown, it should be noted that embodiments are not so limited and other alternative formats are also possible.

In the example shown in FIG. 16A, a VHDx file 1605 includes a set of payload blocks (PBs) 1610 that are each 2 MB. The size of the payload blocks can range from 1 MB to 256 MB. The payload blocks may be located by the BAT which also forms a part of the layout of the VHDx file. There can be sector bitmap blocks which are 1 MB in size and include pieces of the sector bitmap.

A set of file blocks 1615 in the source volume are mapped 1620 to the payload blocks. In this example, a first extent 1625A (shown with a pattern of slanted lines) is mapped to PB0 1630A. A second extent 1625B (shown with a pattern of dots) is mapped to PB1 1630B. A third extent 1625C (shown with a pattern of cross hatches) is mapped to PB2 1630C.

FIG. 16B is a block diagram showing an incremental backup 1640 of file blocks 1645 of the file to an incremental VHDx file. In this example, an incremental backup included extents 1650A and 1650B. Extent 1650A is mapped to PB1 1655A of a set of payload blocks 1660 of the incremental VHDx file. Extent 1650B is mapped to PB2 1655B. The incremental VHDx file is linked 1665 to the parent backup.

Figure 17:
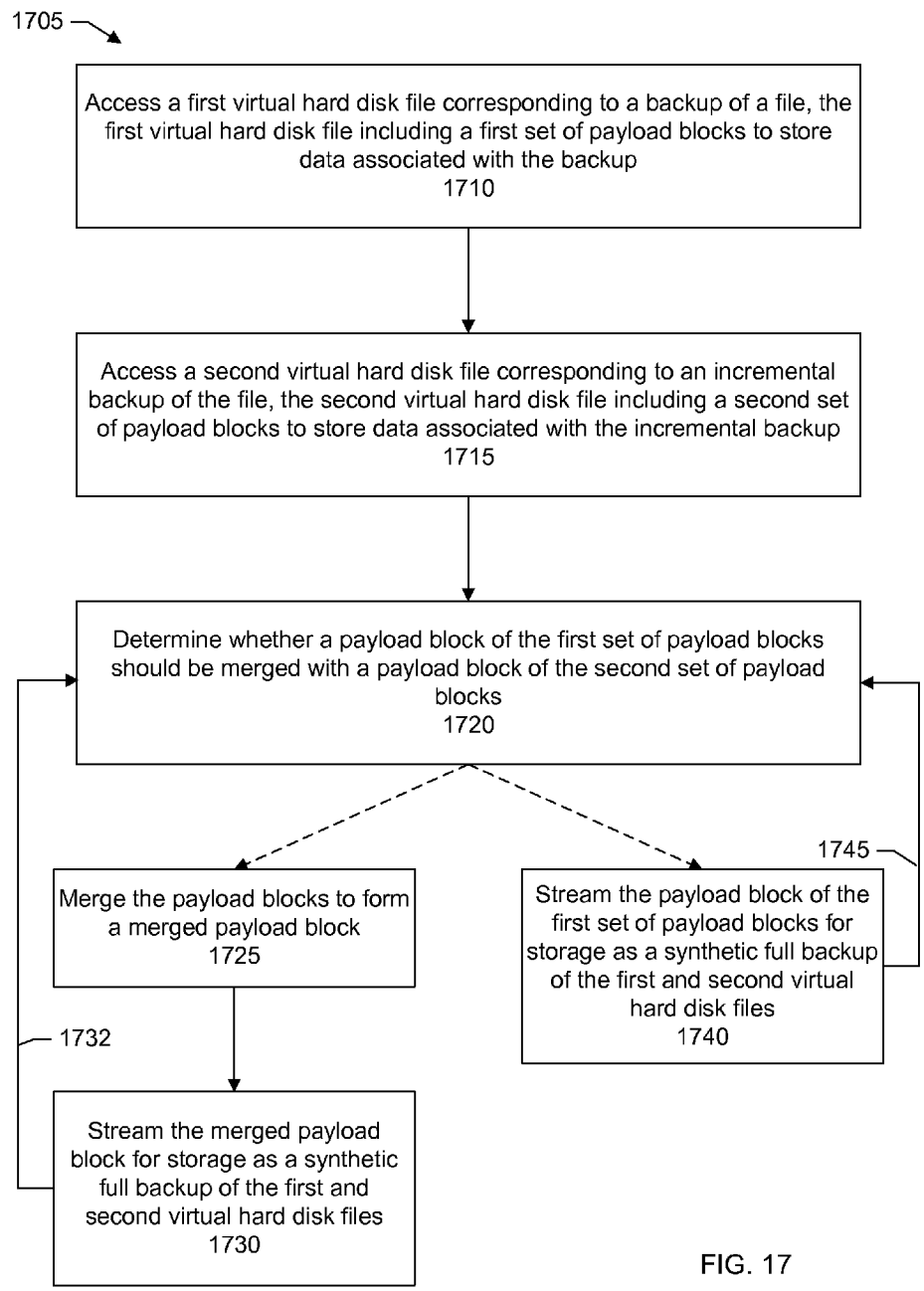
FIG. 17 shows a flow for creating a synthetic full backup of a file.

FIG. 17 shows a flow 1705 for creating a synthetic full backup of a file using a full file backup and one or more incremental file backups. In a specific embodiment, the technique includes a single pass approach that generates a single target stream which contains the merged data of the previous full backup and its changed blocks in a sequential manner, which can then be streamed to any backup media. The system identifies the merged data zones from the entire chain. Since the VHDx is itself described in terms of payload blocks, a technique of the system first determines what payload blocks needs to be merged in the entire chain of backups. The merge granularity is a payload block which can vary from 1 MB to 256 MB. This technique provides for merging one payload block at a time and then proceeding to the next.

More particularly, in a step 1710, the system (e.g., synthetic full backup generator 280—FIG. 2) access a first virtual hard disk file. The first virtual hard disk file corresponds to a backup of a file from a source volume at a time T0. The first virtual hard disk file includes a first set of payload blocks to store data associated with the backup of the file. The backup may be a full backup of the file.

In a step 1715, the system accesses a second virtual hard disk file. The second virtual hard disk file corresponds to an incremental backup of the file from the source volume at a time T1, after time T0. The second virtual hard disk file includes a second set of payload blocks to store data associated with the incremental backup of the file.

In a step 1720, a determination is made for whether a payload block of the first set of payload blocks (or first payload block) and a payload block of the second set of payload blocks (or second payload block) should be merged. Payload blocks may be merged when, for example, there is a corresponding payload block of the second set of payload blocks (i.e., the incremental backup) having changes (e.g., new data). The determination may include scanning or searching for a payload block of the second set of payload blocks that corresponds to the payload block of the first set of payload blocks.

In a step 1725, if the second set of payload blocks includes a corresponding payload block having changes, the payload blocks are merged to form a merged payload block. Data from the payload block of the first set of payload blocks may be merged or combined with data from the corresponding payload block of the second set of payload blocks. In a specific embodiment, the merging is performed without altering or modifying the first and second virtual disks (or copies of the virtual disks) so as to allow for intermediate recoveries. Merging may include copying or placing an extent of the first payload block and an extent of the second payload block into the same payload block. Merging may include copying or placing an extent of the second payload block into a merged payload block and not copying or not placing an extent of the first payload block into the merged payload block, the extent of the first payload block thus having been replaced by the extent of the second payload block.

Merging may include copying or placing an extent of the first payload block and an extent of the second payload block into the same payload block, where the same payload block is the merged payload block and the extent of the second payload block overwrites the extent of the first payload block in the merged payload block. Merging may include copying or placing an extent of the first payload block and an extent of the second payload block into the same payload block, where the same payload block is the merged payload block and the extent of the second payload block does not overwrite the extent of the first payload block in the merged payload block.

The merged payload block may be a payload block that is maintained, distinct, or stored separate from the full and incremental backups. For example, the merged payload block may be stored in a file (e.g., synthetic full backup file) that is separate from the first or original full and incremental backup files. Maintaining or storing the merged payload block separate from the full and incremental backups allows for intermediate recoveries. For example, after a synthetic full operation involving a full backup and one or more incremental backups of a file to generate a synthetic full backup of the file, the file may be recovered to its first full backup even though there may have been one or more incremental backups. The system may maintain or store a synthetic full backup of a file and a first or original full backup of a file along with any number of incremental backups.

In a step 1730, upon or after the payload block merging, the merged payload block is streamed for storage as a synthetic full backup of the first and second virtual hard disk files. The process may then loop 1732 back to perform another determination for a next payload block of the first set of payload blocks.

Alternatively, in a step 1740 if there is no corresponding payload block of the second set of payload blocks having changes to be merged into the payload block of the first set of payload blocks, the payload block (or a copy of data in the payload block) of the first set of payload blocks is streamed for storage as the synthetic full backup of the first and second virtual hard disk files. More particularly, in a specific embodiment, for the child differencing disk (e.g., the second virtual hard disk file corresponding to the incremental backup), if there are no changes then there would be no payload blocks corresponding to them. Hence, if the payload blocks of the incremental are not present, during the merge process, blocks are taken from the last non-empty payload block in the chain (e.g., first virtual hard disk file). In a specific embodiment, empty payload blocks indicate that no changes have been made. The process may then loop 1745 back to perform another determination for a next payload block of the first set of payload blocks.

FIGS. 18-21 are block diagrams showing an example of a synthetic full file merge. Specifically, FIG. 18 shows a full backup of a file at a time T0. Extents 1805A, 1805B, and 1805C have starting offsets and lengths as shown in FIG. 18 have been streamed 1810 in a first full file backup to a parent VHDx file 1815. Extent 1805A has been drawn with a pattern of slanted lines. Extent 1805B has been drawn with a pattern of dots. Extent 1805C has been drawn with a pattern of cross hatches.

The parent VHDx file includes a parent set of payload blocks. Extent 1805A is stored in a payload block (PB 0)

1820A of the parent. Extent 1805B is stored in a payload block (PB 1) 1820B of the parent. Extent 1805C is stored in a payload block (PB 2) 1820C of the parent.

FIG. 19 shows a first incremental backup of the file at a time T1, after time T0. An extent 1905A having a starting offset and length as shown in FIG. 19 has been streamed 1910 in a first incremental backup to a first child VHDx file 1915. Extent 1905A has been drawn with a pattern of horizontal lines.

The first child VHDx file includes a first child set of payload blocks. Extent 1905A is stored in a payload block (PB 1) 1920A of the first child incremental backup. The remaining payload blocks of the first child set of payload blocks may be empty or not present, thus indicating that no changes with respect to those payload blocks have been made.

FIG. 20 shows a second incremental backup of the file at a time T2, after times T0 and T1. An extent 2005A having a starting offset and length as shown in FIG. 20 has been streamed 2010 in a second incremental backup to a second child VHDx file 2015. Extent 2005A has been drawn with a pattern of grid lines.

The second child VHDx file includes a second child set of payload blocks. Extent 2005A is stored in a payload block (PB 0) 2020A of the second child incremental backup. The remaining payload blocks of the second child set of payload blocks may be empty or not present, thus indicating that no changes with respect to those payload blocks have been made.

FIG. 21 shows a synthetic full file merge of the full and incremental backups at a time T3, after times T0, T1, and T2. In this example, extents 1905A, 1805B, 2005A, and 1805C are included in a virtual hard disk file representing a synthetic full backup based on the full backup, first incremental backup, and second incremental backup. Extent 1905A is from PB 1 1920A of the first incremental backup). Extent 1805B is from PB 1 1820B of the full backup. Extent 2005A is from PB 0 2020A of the second incremental backup. Extent 1805C is from PB 2 1820C of the full backup.

More particularly, payload blocks PB 1 1820B from the full backup and corresponding PB 1 1920A from the first incremental backup have been merged to form a merged payload block PB 1 2105 in the synthesized full backup file. Payload block PB 1 2105 includes both extent 1905A and extent 1805B. In this example, however, extent 1805A stored in PB 0 1820A of the full backup is not included in PB 0 2110 of the synthesized full backup file because it has been replaced or overwritten by extent 2005A from corresponding payload block PB 0 2020A of the second incremental backup. A payload block PB 2 2115 of the synthetic full file merge includes extent 1805C from payload block PB 2 1820C of the full file backup which has not changed.

In a specific embodiment, the size of a payload block of a VHDx file can range from 1 MB to 256 MB, and the size of a sector bitmap block is 1 MB. Since, 1 Byte=8 bits a 1 MB sector bitmap can represent 8×1024×1024 (2^23) sectors. The size of the logical sector is typically 512 or 4096 bytes. Each payload block includes multiple logical sectors. In FIG. 21, extents 1905A and 1805B represent changed sectors which do not overlap. Hence, after merging PB 1 both the sectors are shown in payload block PB 1 2105 of the synthetic full backup file. Extents 1805A and 2005A represent changed sectors which do overlap. Hence, after merging PB 0, the sector represented by extent 1805A has been replaced with the sector represented by extent 2005A which is more recent than the sector represented by extent 1805A and payload block PB 0 2110 of the synthetic full backup file does not include the overwritten data.

FIGS. 18-21 show an example of merging a full backup with two incremental file backups to create a synthetic full file merge. It should be appreciated, however, that any number of incremental file backups may be merged with a full backup. For example, there can be one, two, three, four, five, six, seven, eight, nine, ten, or more than ten incremental backups of a file that are merged with a full backup of the file to create a synthetic full file merge of the file.

Depending upon factors such as the type of backup media, computing resources available, and other factors a synthetic full file merge may be performed as soon as the first incremental backup of the file is made, after a threshold number of incremental backups have been made, periodically (e.g., weekly), or on demand. In a specific embodiment, an incremental backup is performed in which changed blocks associated with a file are obtained. In this specific embodiment, rather than creating a child VHDx, the changed blocks are merged with a previous full or parent backup to artificially create a current full file backup. The newly synthesized full file backup then includes original unchanged blocks from the parent backup and new incremental or changed blocks. Thus, recovery of the file does not have to depend on any previous incremental backups.

As discussed above, a technique of the system includes a single pass approach that generates a single target stream which contains the merged data of the previous full and its changed blocks in a sequential manner, which can then be streamed to any backup media. Merged data zones from the entire chain are identified. Since the VHDx is itself described in terms of payload blocks, the method first determines what payload blocks need to be merged in the entire chain of backups. The merge granularity is a payload block which can vary from 1 MB to 256 MB according to the VHDx specification. This method merges one payload block at a time and proceeds to the next.

Figure 22:
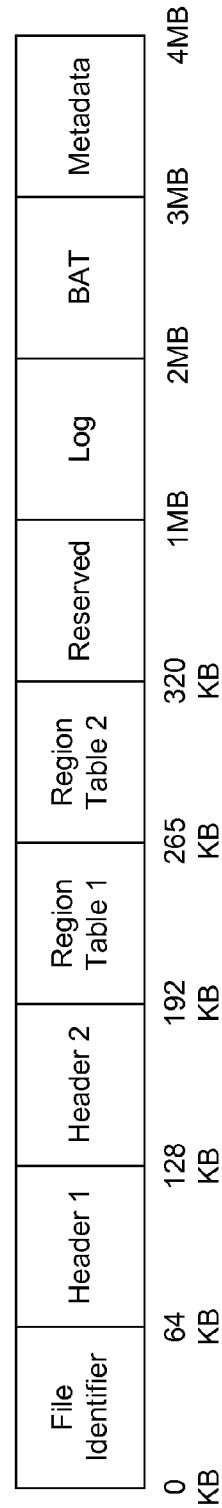
FIG. 22 shows an example of a new VHDx stream.

FIG. 22 shows an example of a new VHDx stream which contains a new header, region, log, and merged BAT which is streamed first to the new file, i.e., the synthesized file. The BAT is a region listed in the region table and includes a single contiguous array of entries specifying the state and the physical file offset for each block. The entries for payload blocks and sector bitmap blocks in the BAT are interleaved at regular intervals. Any updates to the BAT may be made using the log to ensure that the updates are safe to corruptions from system power failure events.

The new merged BAT table includes offsets relative to the new target file which will be eventually streamed to the new synthesized file once the new empty VHDx file is streamed out to the target. The new merged BAT table is prepared by inspecting the BAT entries of each of the backup starting from full backup to N−1 incremental chain. If there is a BAT entry that contains a non-zero offset that means the payload block which the index corresponds to needs to be merged.

Figure 23:
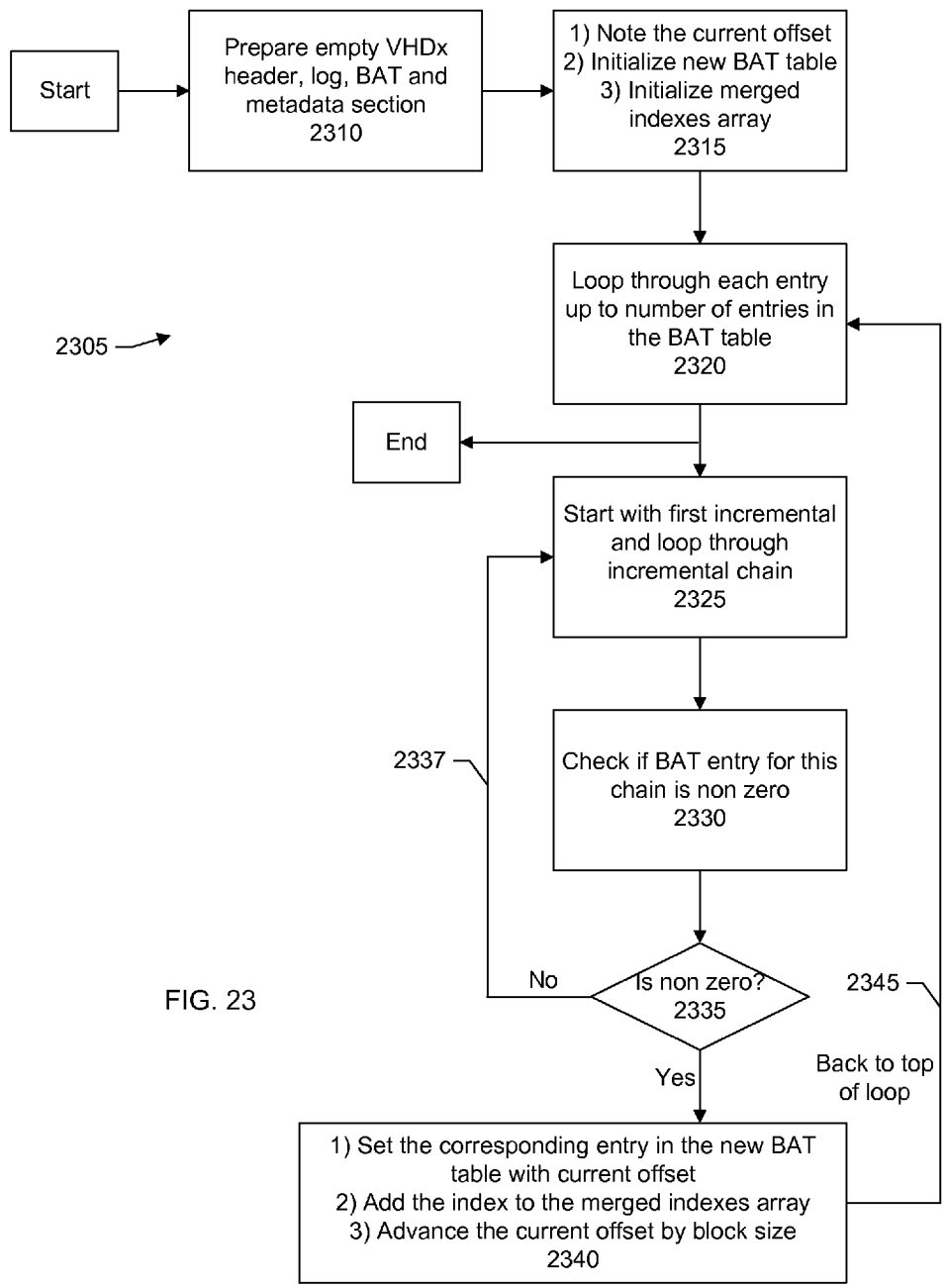
FIG. 23 shows a flow to determine common payload blocks across an incremental chain and generate a new BAT table.

FIG. 23 shows a detailed view of a process 2305 to determine common payload blocks across an incremental chain and generate a new BAT table. In a step 2310, the system prepares an empty VHDx header, log, BAT, and metadata section. In a step 2315, the system notes or identifies the current offset, initializes the new BAT table, and initializes the merged indexes array. In a step 2320, the system loops through each entry up to the number of entries in the BAT table. In a step 2325, the system starts with the first incremental and loops through the incremental chain. In a step 2330, the system checks if the BAT entry for the chain is non zero. In a step 2335, if the BAT entry is non zero, the system loops 2337 back to step 2325. Alternatively, if the BAT entry is non zero, in a step 2340 the system sets the corresponding entry in the new BAT table with the current offset, adds the index to the merged indexes array, and advances the current offset by the block size. The process then loops back 2345 to the top of the loop.

Figure 24:
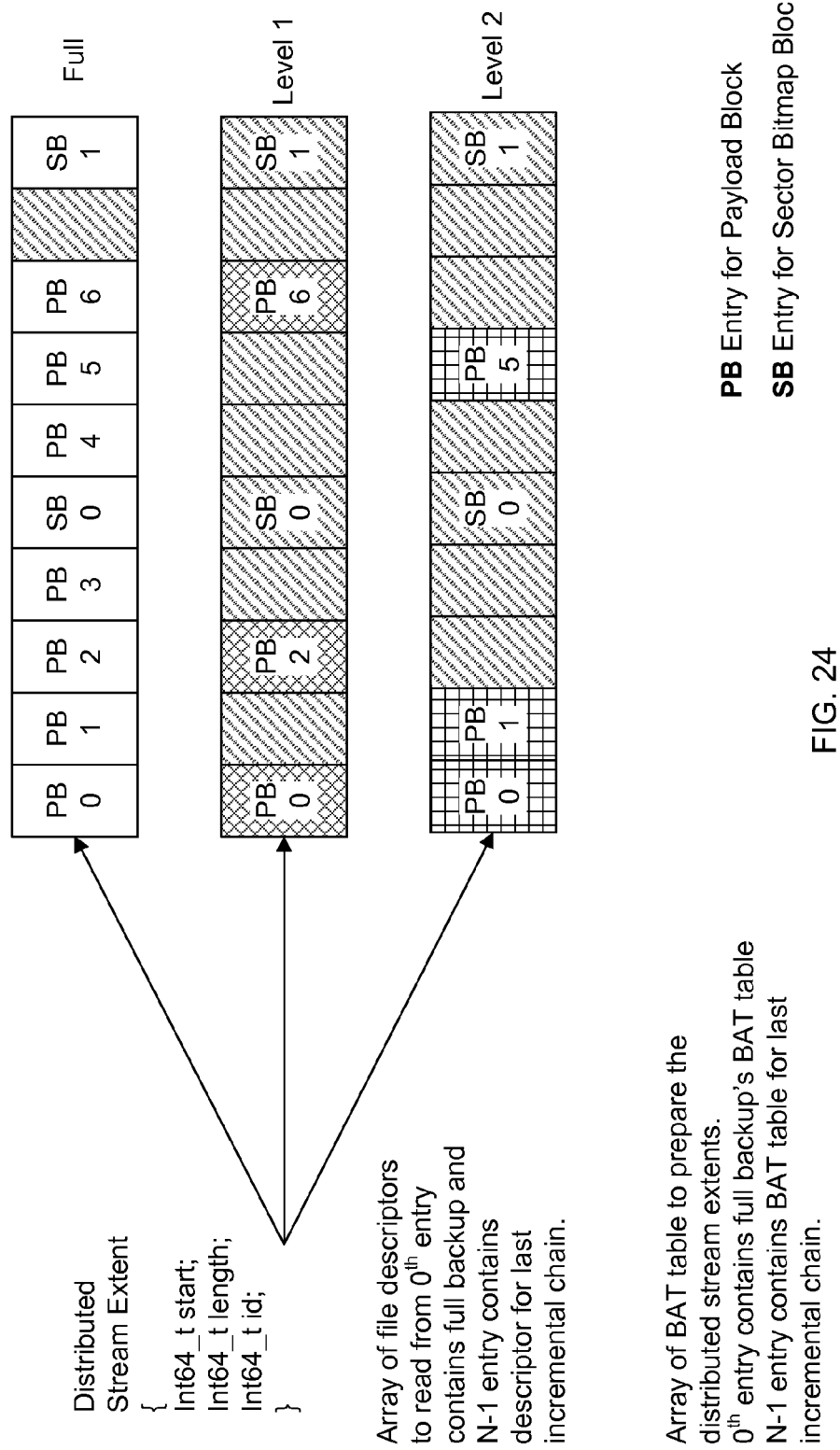
FIG. 24 shows the design elements and constructs used during the merge process.

FIG. 24 shows the design elements and constructs used during the merge process. In a specific embodiment, the distributed stream extent includes the values Int64_t start; Int64_t length; and Int64_t id. An array of file descriptors to read from the $0^{th}$ entry includes the full backup and the N−1 entry includes a descriptor for the last incremental chain. There is an array of BAT table to prepare the distributed stream extents. A $0^{th}$ entry includes a full backup's BAT table. An N−1 entry includes the BAT table for the last incremental chain.

Figure 25:
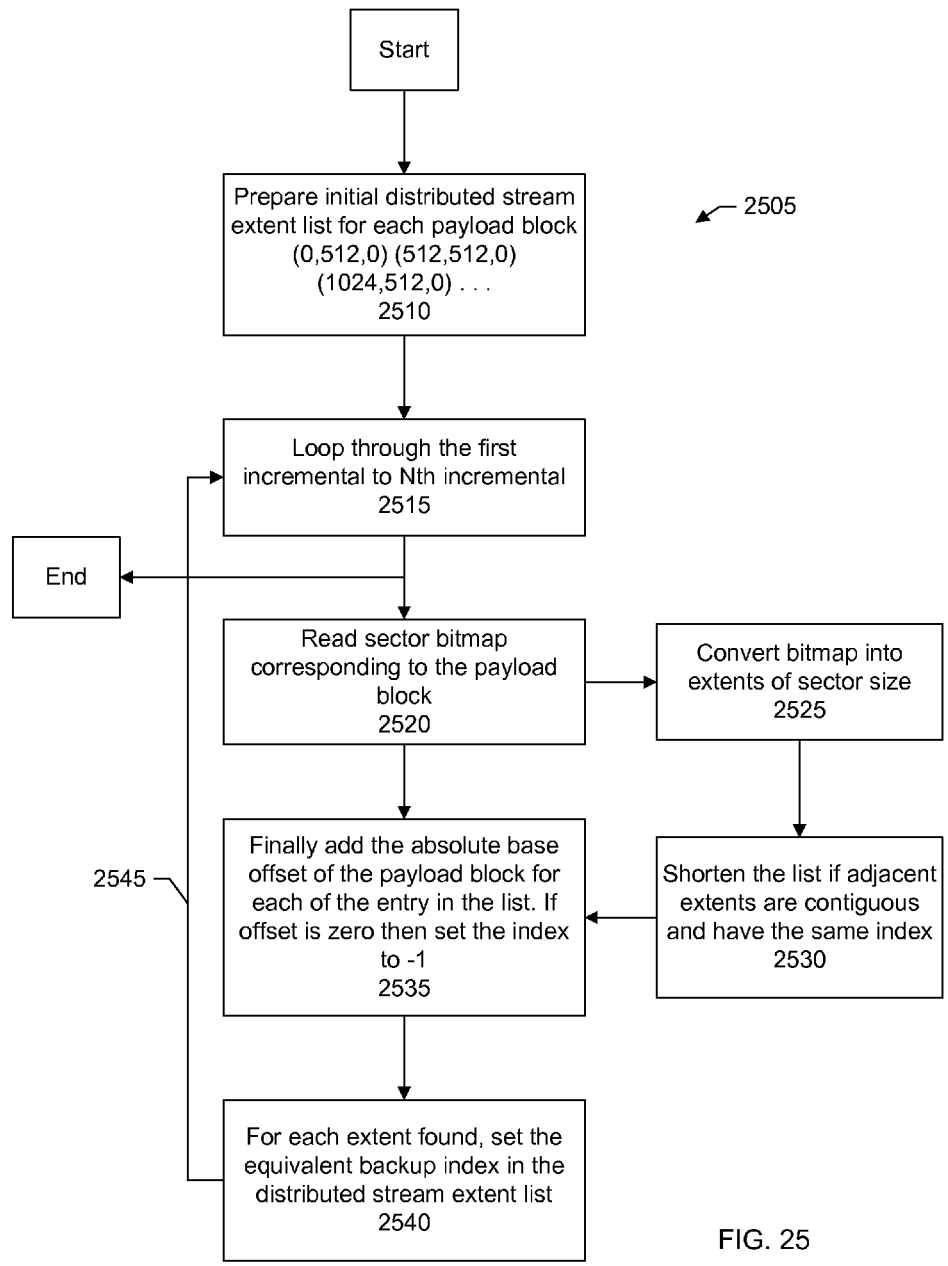
FIG. 25 shows a flow for determining merged payload blocks block-by-block from the merged BAT table.

FIG. 25 shows a flow 2505 for determining merged payload blocks block-by-block from the merged BAT table. In a step 2510, the system prepare initial distributed stream extent list for each payload block, e.g., (0,512,0) (512,512,0) (1024,512,0) . . . . In a step 2515, the system loops through the first incremental to Nth incremental. In a step 2520, the system reads a sector bitmap corresponding to the payload block. In a step 2525, the system converts the bitmap into extents of sector size. In a step 2530, the system shortens the list if adjacent extents are contiguous and have the same index. In a step 2535, the system adds the absolute base offset of the payload block for each of the entries in the list. If offset is zero then the index is set to −1. In a step 2540, for each extent found, the system sets the equivalent backup index in the distributed stream extent list. The process then loops 2545 back to step 2515.

Table C below shows a flow of a specific embodiment for determining merged payload blocks.

TABLE C

| STEP | DESCRIPTION |
|---|---|
| 1 | Get the next merged BAT index from the merged BAT indexes array |
| 2 | Prepare distributed stream extent array in offsets of 512 which points to the base full backup, e.g., (0,512, 0), (512,512,0), (1024,512,0) up to (2 MB-512, 512, 0). |
| 3 | Start with first incremental and loop up to N-1 incremental |
| 3(a) | Get corresponding stream object and BAT table from the global object table |
| 3(b) | Get the sector bitmap offset identified in step (1) |
| 3(c) | Read the sector bitmap fully |
| 3(d) | Convert the sector bitmap into extents of size 512's |
| 3(e) | Loop through each of the extent |
| 3(e)(i) | Get the corresponding extent from the array generated in step (2) |
| 3(e)(ii) | Change the id to point to this stream |
| 4 | Loop back to step (3) |
| 5 | Inspect array (2) and join adjacent extents if it belongs to the same stream and create a new final array. |
| 6 | Set the absolute payload offset for each of the extent generated in step (5) |
| 6(a) | Check if the absolute payload offset is zero. If zero then change the id to point to −1 so that zero's are filled for that range during actual read. In some cases, the sub range within a payload block may not be found in any of the incremental backup chains so it will be pointing to full so the system sets the range to zero. This helps to avoid seeks and reads to the base file. It also increases the speed and the de-duplication performance. |

FIG. 26 is a block diagram showing a merged distributed stream extents of a full backup followed by two incremental backups. In the example shown in FIG. 26, the payload block size is 2 MB and all payload blocks are fully occupied, e.g., (0,2048K) for a full backup level. Merged extents within common payload block are in the following format "(start, length, id)" where id refers to which level of the backup. The payload blocks which need to or should be merged are shown with a pattern of slanted lines.

Figure 27:
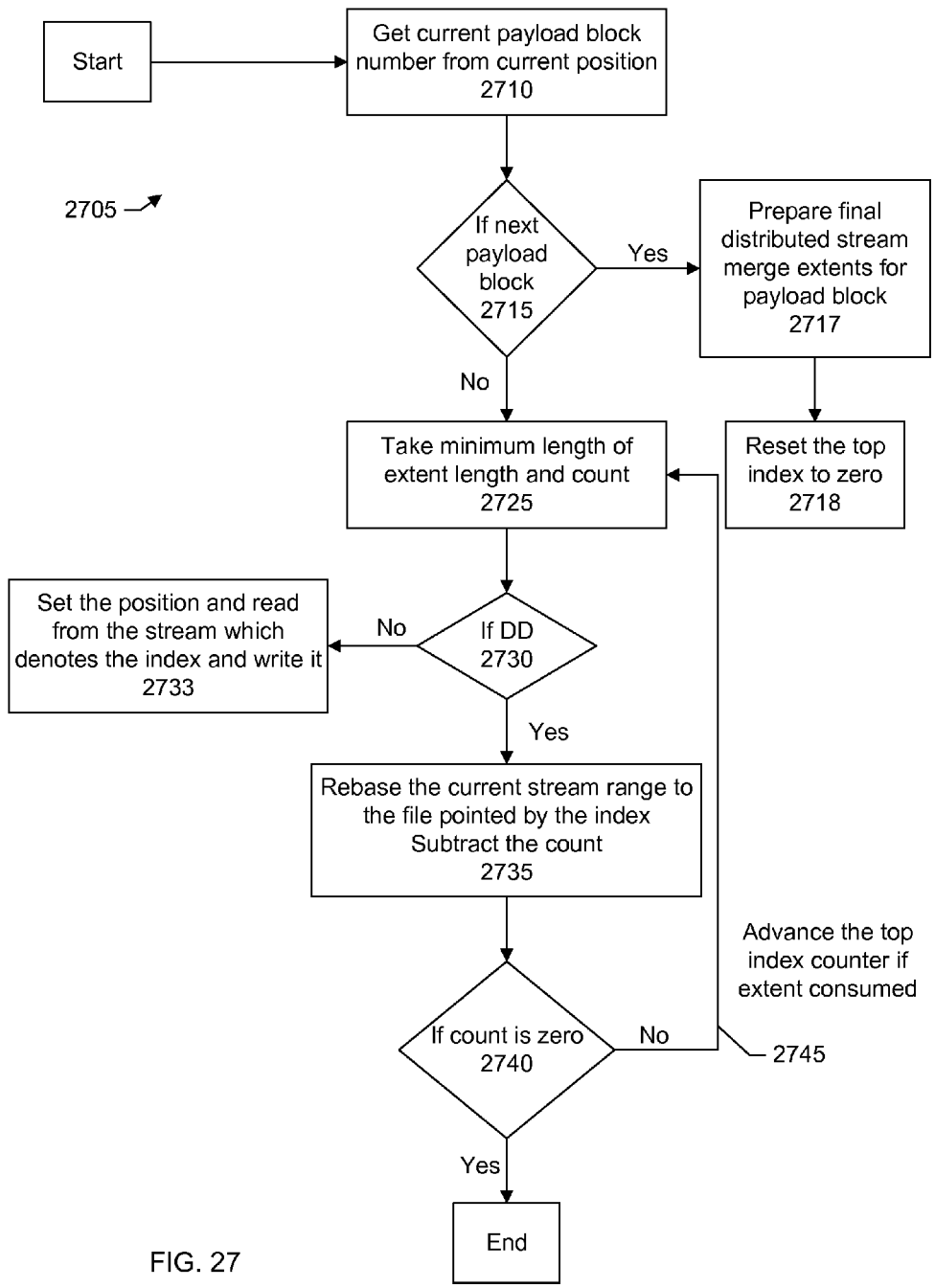
FIG. 27 shows a flow for distributed stream extents representing merged payload block areas across an entire incremental chain.

FIG. 27 shows a flow 2705 for distributed stream extents representing merged payload block areas across an entire incremental chain. In a step 2710, the system obtains a current payload block number from a current position. In a step 2715, a determination is made as to whether it is a next payload block. If yes, in a step 2717, the system prepares a final distributed stream merge extents for payload block. In a step 2718, the system resets the top index to zero.

Alternatively, if it is not the next payload block, in a step 2725, the system takes a minimum length of extent length and count. In a step 2730, a determination is made as to whether the process conforms to a particular architecture of the backup system. In a specific embodiment, the particular architecture includes a Data Domain (DD) architecture as provided by EMC Corporation of Hopkinton, Mass. If the architecture is not a DD architecture, in a step 2733, the system sets the position and reads from the stream which denotes the index and writes it. Alternatively, in a step 2735, the system rebases the current stream range to the file pointed by the index and subtracts the count. If in a step 2740 the count is not zero, the system advances 2745 to the top index counter if the extent is consumed. Alternatively, if the count is zero, the process ends.

Table D below shows a flow of a specific embodiment of read and merge steps during streaming a merged payload block for a first type of synthetic merge. This first type of synthetic merge may be referred to as a regular synthetic merge.

TABLE D

| STEP | DESCRIPTION |
|---|---|
| 1 | Set bytes to read to payload block size |
| 2 | Get the target file position |
| 3 | Loop until the entire payload block is merged |
| 3(a) | Get the top index extent from the final merged array generated for this payload block zone. |
| 3(b) | Take minimum of extent length and bytes to read. |
| 3(c) | Get extent index to which stream it belongs in the incremental chain. |
| 3(d) | Get the corresponding stream object from the stream table array |
| 3(e) | Set the stream position |
| 3(f) | Read the minimum length fully |
| 3(g) | Write it to the target file at the target position |
| 3(h) | Advance the target position by 3(b) |
| 3(i) | Add the extent start offset by 3(b) |
| 3(j) | Decrement the extent length by 3(b) |
| 3(k) | Decrement the bytes read by 3(b) |
| 3(l) | If extent length is zero then move the top index to the next distributed stream extent. |
| 4 | End of loop |

Table E below shows a flow of a specific embodiment of read and merge steps during streaming a merged payload block for a second type of synthetic merge. This second type of synthetic merge may be referred to as a DD native synthetic merge.

TABLE E

| STEP | DESCRIPTION |
| --- | --- |
| 1 | Set bytes to read to payload block size |
| 2 | Get the target file position |
| 3 | Loop until the entire payload block is merged |
| 3(a) | Get the top index extent from the final merged array generated for this payload block zone. |
| 3(b) | Take minimum of extent length and bytes to read. |
| 3(c) | Get extent index to which stream it belongs in the incremental chain. |
| 3(d) | Get the corresponding stream object from the stream table array |
| 3(e) | set ddp_synthesize extent to current extent start and length |
| 3(f) | call ddp_synthesize_file API |
| 3(g) | Advance the target position by 3(b) |
| 3(h) | Add the extent start offset by 3(b) |
| 3(i) | Decrement the extent length by 3(b) |
| 3(j) | Decrement the bytes read by 3(b) |
| 3(k) | If extent length is zero then move the top index to the next distributed stream extent. |
| 5 | End of loop |

In the description above, certain embodiments were discussed in the context of a VHD formatted file, VHDx formatted file, or both. It should be appreciated, however, that aspects and principles of the system can be applied to other virtual disk formats such as VMDK formatted files (e.g., VMware virtual disk file) which may be used in the Linux OS.

In a specific embodiment, a method includes identifying a file, stored in a volume of a client, for backup in a mountable format to a backup storage server, creating on the client a template virtual volume that corresponds to the volume of the client in which the file is stored, identifying a set of file extents occupied by the file to be backed up, creating a backup stream from the template virtual volume, if a file extent from the backup stream is not within the set of file extents, accessing the template virtual volume to backup a data block associated with the template virtual volume, and if the file extent is within the set of file extents, accessing the file to backup a data block associated with the file.

The creating on the client a template virtual volume that corresponds to the volume of the client in which the file is stored may include formatting the template virtual volume with a file system of the volume, creating within the template virtual volume a template file having a size that matches a size of the file to be backed up, and creating within the template virtual volume a directory structure that matches a directory structure of the file to be backed up. The file may be backed up as a Virtual Hard Disk (VHD) formatted file or a Hyper-V (VHDx) formatted file.

Accessing the file to backup a data block associated with the file may include converting from a virtual cluster number (VCN) to a logical cluster number (LCN). The method may further include after backing up a last data block of the template virtual volume and a last data block of the file, deleting the template virtual volume created on the client. The file to be backed up may include a database.

In another specific embodiment, there is a system for backing up a file, the system including a processor-based system executed on a computer system and configured to: identify a file, stored in a volume of a client, for backup in a mountable format to a backup storage server, create on the client a template virtual volume that corresponds to the volume of the client in which the file is stored, identify a set of file extents occupied by the file to be backed up, create a backup stream from the template virtual volume, if a file extent from the backup stream is not within the set of file extents, access the template virtual volume to backup a data block associated with the template virtual volume, and if the file extent is within the set of file extents, access the file to backup a data block associated with the file.

In another specific embodiment, there is a computer program product, comprising a non-transitory computer-readable medium having a computer-readable program code embodied therein, the computer-readable program code adapted to be executed by one or more processors to implement a method including identifying a file, stored in a volume of a client, for backup in a mountable format to a backup storage server, creating on the client a template virtual volume that corresponds to the volume of the client in which the file is stored, identifying a set of file extents occupied by the file to be backed up, creating a backup stream from the template virtual volume, if a file extent from the backup stream is not within the set of file extents, accessing the template virtual volume to backup a data block associated with the template virtual volume, and if the file extent is within the set of file extents, accessing the file to backup a data block associated with the file.

In a specific embodiment, a method for making an incremental backup of changes to a particular file includes receiving from a change block tracking (CBT) module information identifying a plurality of changed blocks on a volume of a client, the changed blocks being blocks of the volume that have changed since a previous backup of the client, filtering the plurality of changed blocks to identify a subset of changed blocks that are associated with the particular file, streaming the subset of changed blocks to a backup storage server for storage as an incremental virtual hard disk file, and associating the incremental virtual hard disk file to a full backup virtual hard disk file, the full backup virtual hard disk file being a full backup of a previous version of the particular file.

The method may further include not streaming blocks of the plurality of changed blocks that are outside the subset of changed blocks. Filtering the plurality of changed blocks may include identifying a set of extents on the client occupied by the particular file, comparing the identified set of extents to the information identifying the plurality of changed blocks, and based on the comparison, if a changed block maps to an extent of the set of extents, determining that the changed block is associated with the particular file.

Filtering the plurality of changed blocks may include identifying a set of extents on the client occupied by the particular file, comparing the identified set of extents to the information identifying the plurality of changed blocks, and based on the comparison, if the changed block does not map to any extent of the set of extents, determining that the changed block is not associated with the particular file. The file may include a database file.

In a specific embodiment, the method further includes before the receiving from a change block tracking module information identifying a plurality of changed blocks, creating a container having a size that accommodates a size of the previous version of the particular file, creating a temporary file having a size that corresponds to the size of the previous version of the particular file, the size of the temporary file being less than the size of the container, backing up, using the container and the temporary file, the previous version of the particular file to create the full backup virtual hard disk file, and after the backing up, deleting the container and the temporary file, wherein the streaming the subset of changed blocks to a backup storage server for storage as an incremental virtual hard disk file comprises not creating another container.

The incremental virtual hard disk file may include a block from the particular file that has changed with respect to the previous version of the particular file, a newly occupied block from the particular file, the newly occupied block not being in the previous version of the particular file, or both.

In another specific embodiment, there is a system for incrementally backing up a file, the system including a processor-based system executed on a computer system and configured to receive from a change block tracking (CBT) module information identifying a plurality of changed blocks on a volume of a client, the changed blocks being blocks of the volume that have changed since a previous backup of the client, filter the plurality of changed blocks to identify a subset of changed blocks that are associated with the particular file, stream the subset of changed blocks to a backup storage server for storage as an incremental virtual hard disk file, and associate the incremental virtual hard disk file to a full backup virtual hard disk file, the full backup virtual hard disk file being a full backup of a previous version of the particular file.

In another specific embodiment, there is a computer program product, comprising a non-transitory computer-readable medium having a computer-readable program code embodied therein, the computer-readable program code adapted to be executed by one or more processors to implement a method including: receiving from a change block tracking (CBT) module information identifying a plurality of changed blocks on a volume of a client, the changed blocks being blocks of the volume that have changed since a previous backup of the client, filtering the plurality of changed blocks to identify a subset of changed blocks that are associated with the particular file, streaming the subset of changed blocks to a backup storage server for storage as an incremental virtual hard disk file, and associating the incremental virtual hard disk file to a full backup virtual hard disk file, the full backup virtual hard disk file being a full backup of a previous version of the particular file.

In a specific embodiment, a method includes accessing a first virtual hard disk file corresponding to a backup of a file, the first virtual hard disk file comprising a first plurality of payload blocks to store data associated with the backup, accessing a second virtual hard disk file corresponding to an incremental backup of the file, the second virtual hard disk file comprising a second plurality of payload blocks to store data associated with the incremental backup, merging data from a payload block of the first plurality payload blocks with data from a corresponding payload block of the second plurality of payload blocks to form a merged payload block, and streaming the merged payload block to a backup media for storage as a synthetic full backup of the first and second virtual hard disk files, wherein the merging does not alter the first and second virtual hard disk files.

The payload block of the first plurality of payload blocks may include a first extent, the corresponding payload block of the second plurality of payload blocks may include a second extent, and the merging may include placing the first and second extents in the merged payload block. The merging may include replacing the first extent with the second extent for the merged payload block, the merged payload block thereby having the second extent and not having the first extent.

In a specific embodiment, the method further includes after the merging, determining whether a next payload block of the first plurality of payload blocks should be merged, determining that the next payload block should not be merged because the second plurality of payload blocks do not include changes corresponding to the next payload block, and streaming data of the next payload block to the backup media for storage as the synthetic full backup of the first and second virtual hard disk files.

The method may include streaming data of the merged payload block in a stream, and streaming data of another payload block in the same stream, the data of the other payload block comprising data from a next payload block of the first plurality of payload blocks, data from a next payload block of the second plurality of payload blocks, or both.

In another specific embodiment, there is a system for synthesizing a full backup of a file in a mountable format, the system includes a processor-based system executed on a computer system and configured to: access a first virtual hard disk file corresponding to a backup of the file, the first virtual hard disk file comprising a first plurality of payload blocks to store data associated with the backup, access a second virtual hard disk file corresponding to an incremental backup of the file, the second virtual hard disk file comprising a second plurality of payload blocks to store data associated with the incremental backup, merge data from a payload block of the first plurality payload blocks with data from a corresponding payload block of the second plurality of payload blocks to form a merged payload block, and stream the merged payload block to a backup media for storage as a synthetic full backup of the first and second virtual hard disk files, wherein the merge does not alter the first and second virtual hard disk files.

In another specific embodiment, there is a computer program product, comprising a non-transitory computer-readable medium having a computer-readable program code embodied therein, the computer-readable program code adapted to be executed by one or more processors to implement a method including accessing a first virtual hard disk file corresponding to a backup of a file, the first virtual hard disk file comprising a first plurality of payload blocks to store data associated with the backup, accessing a second virtual hard disk file corresponding to an incremental backup of the file, the second virtual hard disk file comprising a second plurality of payload blocks to store data associated with the incremental backup, merging data from a payload block of the first plurality payload blocks with data from a corresponding payload block of the second plurality of payload blocks to form a merged payload block, and streaming the merged payload block to a backup media for storage as a synthetic full backup of the first and second virtual hard disk files, wherein the merging does not alter the first and second virtual hard disk files.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for making an incremental backup of changes to a particular file comprising:
   receiving from a change block tracking (CBT) module information identifying a plurality of changed blocks on a volume of a client, the changed blocks being blocks of the volume that have changed since a previous backup of the client;
   filtering the plurality of changed blocks to identify a subset of changed blocks that are associated with the particular file;
   streaming the subset of changed blocks to a backup storage server for storage as an incremental virtual hard disk file;
   associating the incremental virtual hard disk file to a full backup virtual hard disk file, the full backup virtual hard disk file being a full backup of a previous version of the particular file;
   before the receiving from a change block tracking module information identifying a plurality of changed blocks, creating a container having a size that accommodates a size of the previous version of the particular file;
   creating a temporary file having a size that corresponds to the size of the previous version of the particular file, the size of the temporary file being less than the size of the container;
   backing up, using the container and the temporary file, the previous version of the particular file to create the full backup virtual hard disk file; and
   after the backing up, deleting the container and the temporary file, wherein the streaming the subset of changed blocks to a backup storage server for storage as an incremental virtual hard disk file comprises not creating another container.

2. The method of claim 1 comprising not streaming blocks of the plurality of changed blocks that are outside the subset of changed blocks.

3. The method of claim 1 wherein the filtering the plurality of changed blocks comprises:
   identifying a set of extents on the client occupied by the particular file;
   comparing the identified set of extents to the information identifying the plurality of changed blocks; and
   based on the comparison, if a changed block maps to an extent of the set of extents, determining that the changed block is associated with the particular file.

4. The method of claim 1 wherein the filtering the plurality of changed blocks comprises:
   identifying a set of extents on the client occupied by the particular file;
   comparing the identified set of extents to the information identifying the plurality of changed blocks; and
   based on the comparison, if a changed block does not map to any extent of the set of extents, determining that the changed block is not associated with the particular file.

5. The method of claim 1 wherein the file comprises a database file.

6. The method of claim 1 wherein the incremental virtual hard disk file comprises a block from the particular file that has changed with respect to the previous version of the particular file, a newly occupied block from the particular file, the newly occupied block not being in the previous version of the particular file, or both.

7. The method of claim 1 wherein the volume comprises a first directory structure within which the previous version of the particular file resides, and the method comprises:
   creating, within the container, a second directory structure, wherein the second directory structure matches the first directory structure.

8. The method of claim 7 wherein the temporary file is created in the second directory structure.

9. The method of claim 1 wherein the temporary file is empty during the backing up.

10. The method of claim 1 wherein the backing up, using the container and the temporary file, comprises:
    reading the volume to backup content of the previous version of the particular file; and
    reading the container to backup metadata associated with the content, wherein the metadata in the container specifies a directory path that matches a directory path of the volume within which the previous version of the particular file resides.

11. A system for incrementally backing up a particular file, the system comprising:
    a processor-based system executed on a computer system and comprising a processor, wherein the processor is configured to:
    receive from a change block tracking (CBT) module information identifying a plurality of changed blocks on a volume of a client, the changed blocks being blocks of the volume that have changed since a previous backup of the client;
    filter the plurality of changed blocks to identify a subset of changed blocks that are associated with the particular file;
    stream the subset of changed blocks to a backup storage server for storage as an incremental virtual hard disk file;
    associate the incremental virtual hard disk file to a full backup virtual hard disk file, the full backup virtual hard disk file being a full backup of a previous version of the particular file;
    before the receipt from a change block tracking module information identifying a plurality of changed blocks, create a container having a size that accommodates a size of the previous version of the particular file;
    create a temporary file having a size that corresponds to the size of the previous version of the particular file, the size of the temporary file being less than the size of the container;
    backup, using the container and the temporary file, the previous version of the particular file to create the full backup virtual hard disk file; and
    after the backup, delete the container and the temporary file, wherein the stream of the subset of changed blocks to a backup storage server for storage as an incremental virtual hard disk file does not comprise creation of another container.

12. The system of claim 11 wherein the processor-based system is configured to:
    not stream blocks of the plurality of changed blocks that are outside the subset of changed blocks.

13. The system of claim 11 wherein the processor-based system is configured to:
    identify a set of extents on the client occupied by the particular file;
    compare the identified set of extents to the information identifying the plurality of changed blocks; and
    based on the comparison, if a changed block maps to an extent of the set of extents, determine that the changed block is associated with the particular file.

14. The system of claim 11 wherein the processor-based system is configured to:

identify a set of extents on the client occupied by the particular file;

compare the identified set of extents to the information identifying the plurality of changed blocks; and based on the comparison, if a changed block does not map to any extent of the set of extents, determine that the changed block is not associated with the particular file.

15. A computer program product, comprising a non-transitory computer-readable medium having a computer-readable program code embodied therein, the computer-readable program code adapted to be executed by one or more processors to implement a method comprising:

receiving from a change block tracking (CBT) module information identifying a plurality of changed blocks on a volume of a client, the changed blocks being blocks of the volume that have changed since a previous backup of the client;

filtering the plurality of changed blocks to identify a subset of changed blocks that are associated with a particular file;

streaming the subset of changed blocks to a backup storage server for storage as an incremental virtual hard disk file;

associating the incremental virtual hard disk file to a full backup virtual hard disk file, the full backup virtual hard disk file being a full backup of a previous version of the particular file;

before the receiving from a change block tracking module information identifying a plurality of changed blocks, creating a container having a size that accommodates a size of the previous version of the particular file;

creating a temporary file having a size that corresponds to the size of the previous version of the particular file, the size of the temporary file being less than the size of the container;

backing up, using the container and the temporary file, the previous version of the particular file to create the full backup virtual hard disk file; and after the backing up, deleting the container and the temporary file, wherein the streaming the subset of changed blocks to a backup storage server for storage as an incremental virtual hard disk file comprises not creating another container.

16. The computer program product of claim 15 wherein the method comprises not streaming blocks of the plurality of changed blocks that are outside the subset of changed blocks.

17. The computer program product of claim 15 wherein the filtering the plurality of changed blocks comprises:

identifying a set of extents on the client occupied by the particular file;

comparing the identified set of extents to the information identifying the plurality of changed blocks; and based on the comparison, if a changed block maps to an extent of the set of extents, determining that the changed block is associated with the particular file.

18. The computer program product of claim 15 wherein the filtering the plurality of changed blocks comprises:

identifying a set of extents on the client occupied by the particular file;

comparing the identified set of extents to the information identifying the plurality of changed blocks; and based on the comparison, if a changed block does not map to any extent of the set of extents, determining that the changed block is not associated with the particular file.

* * * * *